(12) United States Patent
Franklin et al.

(10) Patent No.: US 7,797,431 B2
(45) Date of Patent: *Sep. 14, 2010

(54) ENHANCED DATA EXCHANGE AND FUNCTIONALITY CONTROL SYSTEM AND METHOD

(75) Inventors: Richard L. Franklin, Madison, AL (US); Robert Cuffe, Madison, AL (US); Willard Case, 104 Arden Ave., Madison, AL (US) 35758; Mark D. Roberts, Huntsville, AL (US)

(73) Assignee: Willard Case, Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/987,515

(22) Filed: Nov. 30, 2007

(65) Prior Publication Data

US 2008/0155006 A1 Jun. 26, 2008

Related U.S. Application Data

(63) Continuation-in-part of application No. 11/878,226, filed on Jul. 23, 2007, which is a continuation of application No. 09/779,456, filed on Feb. 9, 2001, now Pat. No. 7,249,190.

(51) Int. Cl.
*G06F 15/16* (2006.01)
(52) U.S. Cl. .................. 709/227; 709/201; 709/203; 709/219; 709/228
(58) Field of Classification Search .......... 709/201, 709/203, 219, 227, 228
See application file for complete search history.

(56) References Cited

U.S. PATENT DOCUMENTS 4,799,156 A 1/1989 Shavit et al.

| 5,630,066 | A |   | 5/1997 | Gosling |
|---|---|---|---|---|
| 5,692,183 | A |   | 11/1997 | Hapner et al. |
| 5,701,451 | A |   | 12/1997 | Rogers et al. |
| 5,754,772 | A |   | 5/1998 | Leaf |
| 5,758,153 | A |   | 5/1998 | Atsatt et al. |
| 5,787,019 | A |   | 7/1998 | Knight et al. |
| 5,793,954 | A |   | 8/1998 | Baker et al. |
| 5,794,232 | A |   | 8/1998 | Mahlum et al. |
| 5,809,145 | A |   | 9/1998 | Slik et al. |
| 5,809,250 | A |   | 9/1998 | Kisor |
| 5,809,507 | A |   | 9/1998 | Cavanaugh |
| 5,812,865 | A | * | 9/1998 | Theimer et al. ............. 709/228 |
| 5,815,661 | A |   | 9/1998 | Gosling |
| 5,842,014 | A |   | 11/1998 | Brooks et al. |

(Continued)

OTHER PUBLICATIONS

Kuny, Terry (1997) "Push Publishing", National Library of Canada, Information Technology Services, Network Notes #41, ISSN 1201-4338.

(Continued)

*Primary Examiner*—Liangche A Wang
(74) *Attorney, Agent, or Firm*—Venable LLP; Robert S. Babayi

(57) ABSTRACT

An enhanced data exchange and functionality control system and method are provided. A first executable code having core functionality is provided to a computing device. The message includes partial executable code that merges with the first executable code to extend the core functionality as required for the computing device to execute upon data received via the message, via another message, or via another source.

16 Claims, 21 Drawing Sheets

U.S. PATENT DOCUMENTS

| | | | |
|---|---|---|---|
| 5,881,230 A | 3/1999 | Christensen et al. | |
| 5,892,909 A | 4/1999 | Grasso et al. | |
| 5,903,728 A | 5/1999 | Semenzato | |
| 5,913,033 A | 6/1999 | Grout | |
| 5,928,323 A | 7/1999 | Gosling et al. | |
| 5,974,441 A | 10/1999 | Rogers et al. | |
| 6,041,362 A | 3/2000 | Mears et al. | |
| 6,067,579 A | 5/2000 | Hardman et al. | |
| 6,212,546 B1 | 4/2001 | Starkovich et al. | |
| 6,216,152 B1 | 4/2001 | Wong et al. | |
| 6,295,551 B1 | 9/2001 | Roberts et al. | |
| 6,339,782 B1 | 1/2002 | Gerard et al. | |
| 6,369,821 B2 | 4/2002 | Merrill et al. | |
| 6,397,220 B1 | 5/2002 | Deisinger et al. | |
| 6,446,111 B1 | 9/2002 | Lowery | |
| 6,449,653 B2 | 9/2002 | Klemets et al. | |
| 6,463,445 B1 | 10/2002 | Suzuki et al. | |
| 6,631,396 B2 | 10/2003 | Meyer et al. | |
| 6,654,765 B2 | 11/2003 | Wong et al. | |
| 6,671,800 B1 | 12/2003 | McInally et al. | |
| 6,804,707 B1 | 10/2004 | Ronning | |
| 6,865,715 B2 | 3/2005 | Uchino et al. | |
| 6,874,143 B1 | 3/2005 | Murray et al. | |
| 6,883,168 B1 | 4/2005 | James et al. | |
| 6,920,476 B2 | 7/2005 | McGann et al. | |
| 6,920,567 B1 | 7/2005 | Doherty et al. | |
| 7,000,230 B1 | 2/2006 | Murray et al. | |
| 7,003,546 B1 * | 2/2006 | Cheah et al. | 709/200 |
| 7,003,547 B1 * | 2/2006 | Hubbard | 709/201 |
| 7,069,554 B1 | 6/2006 | Stammers et al. | |
| 7,080,386 B2 | 7/2006 | Thrift et al. | |
| 7,188,186 B1 | 3/2007 | Meyer et al. | |
| 7,197,499 B2 | 3/2007 | Turba et al. | |
| 7,277,911 B2 * | 10/2007 | Cheah | 709/201 |
| 7,293,059 B2 * | 11/2007 | Pearson | 709/201 |
| 7,346,848 B1 | 3/2008 | Ruthfield et al. | |
| 2001/0013068 A1 | 8/2001 | Klemets et al. | |
| 2001/0052034 A1 | 12/2001 | Takimoto | |
| 2002/0019844 A1 * | 2/2002 | Kurowski et al. | 709/201 |
| 2003/0046315 A1 | 3/2003 | Feig | |
| 2006/0271493 A1 | 11/2006 | Stefik et al. | |
| 2007/0208802 A1 | 9/2007 | Barman et al. | |

OTHER PUBLICATIONS

Microsoft Corp. Press Release (1996) "Microsoft Leads Industry to Standardize on Formats of Internet Push Channels; Submits Channel Definition Format Specification to W3c: More Than 30 Leading Companies Rally behind CDF as an Open Industry Specification for Optmizing the "Broadcast" of Information to Millions of Internet Users".

Sigmon, Tim (1997) "The Push of the Internet",Virginia Edu, I, 2.

International Search Report and the Written Opinion issued in International Applicaton No. PCT/US 08/13230, dated May 29, 2009, and Notification of the International Search Report.

* cited by examiner

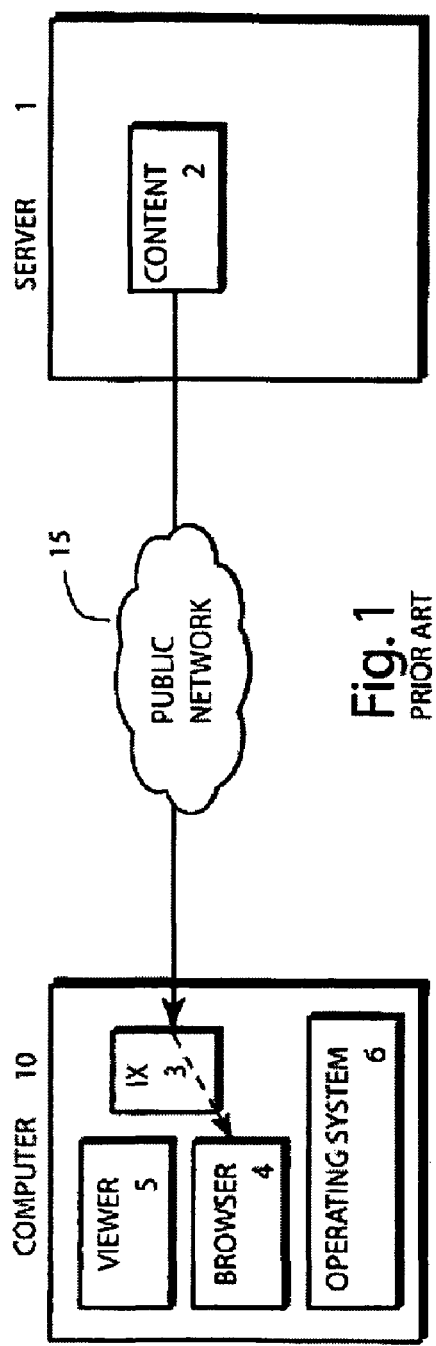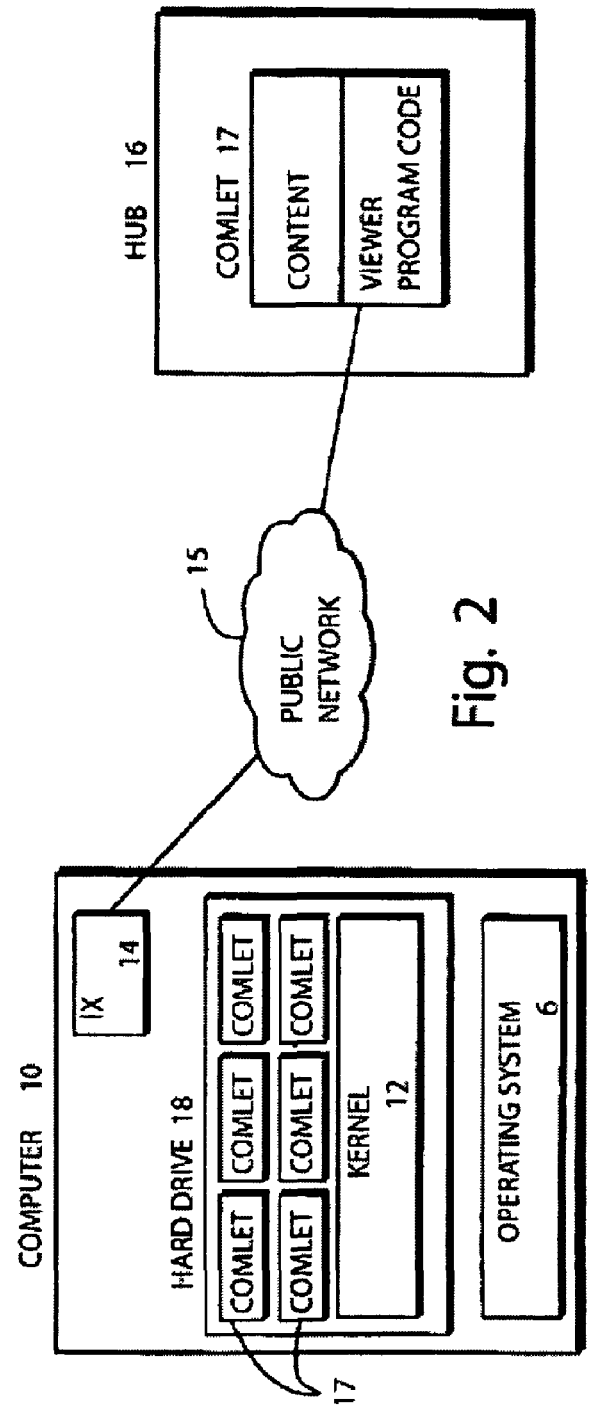

| Select | Name | Date | Profile |
|--------|------|------|---------|
| ☐ | Foca Bob | 12/12/2000 | Website |
| ☐ | Same Cat | 12/11/2000 | Website |
| ☐ | Mary McCrary | 12/11/2000 | Website |
| ☐ | Bob Cuffe | 12/10/2000 | Website |
| ☐ | Rick Franklin | 12/10/2000 | Website |
| ☐ | Rick Franklin | 12/10/2000 | Website |
| ☐ | Bill Henderson | 12/10/2000 | Website |
| ☐ | Barl Mason | 12/9/2000 | Website |
| ☐ | Beth Pugh | 12/9/2000 | Website |
| ☐ | Anon: jbz | 12/9/2000 | Website |
| ☐ | Anon: barkley | 12/9/2000 | Website |
| ☐ | Anon: asdf | 12/8/2000 | Website |
| ☐ | Anon: fsetting | 12/8/2000 | Website |
| ☐ | Anon: FEWEF | 12/8/2000 | Website |
| ☐ | Anon: BKK | 12/7/2000 | Website |
| ☐ | Anon: YER | 12/7/2000 | Website |
| ☐ | Anon: 1KB# | 12/6/2000 | Website |
| ☐ | Anon: WLF | 12/6/2000 | Website |
| ☐ | Anon: EEWF | 12/5/2000 | Website |
| ☐ | Anon: MMM | 12/5/2000 | Website |
| ☐ | Anon: FEWR | 12/5/2000 | Website |
| ☐ | Anon: HGF | 12/4/2000 | Website |
| ☐ | Anon: GREGR | 12/4/2000 | Website |
| ☐ | Anon: CABLEMAN | 12/4/2000 | Website |
| ☐ | Anon: BOB | 12/3/2000 | Website |
| ☐ | Anon: FFTLEE | 12/3/2000 | Website |
| ☐ | Anon: POKM | 12/2/2000 | Website |
| ☐ | Anon: POPL | 12/2/2000 | Website |
| ☐ | Anon: REWER | 12/2/2000 | Website |
| ☐ | Anon: FEW | 12/1/2000 | Website |
| ☐ | Anon: GHHH | 12/1/2000 | Website |

| Select | Title | Type |
|--------|-------|------|
| ☐ | About DR Horton Hi Bob | SLIDES |
| ☐ | Great to meet you | LETTER |
| ☐ | Beautiful Elington | HOME TOUR |

Clear Checkboxes

Fig. 12

| | | | |
|---|---|---|---|
| ☐ | Anon: VGNBB | 12/12/2000 | Website |
| ☐ | Anon: FLWIWET | 12/11/2000 | Website |
| ☐ | Anon: 54J4545 | 12/11/2000 | Website |
| ☐ | Anon: 5J45J5 | 12/10/2000 | Website |
| ☐ | Anon: # | 12/10/2000 | Website |
| ☐ | Anon: asdfj | 12/10/2000 | Website |
| ☐ | Anon: QQQ | 12/10/2000 | Website |
| ☐ | Anon: ASDDTE | 12/9/2000 | Website |
| ☐ | Anon: HEWEFG | 12/9/2000 | Website |
| ☐ | Anon: POL | 12/9/2000 | Website |
| ☐ | Anon: YIRE | 12/9/2000 | Website |
| ☐ | Anon: ASDESDF | 12/8/2000 | Website |
| ☐ | Anon: PWLF | 12/8/2000 | Website |
| ☐ | Anon: GREG | 12/8/2000 | Website |
| ☐ | Anon: IRF | 12/7/2000 | Website |
| ☐ | Anon: HBH | 12/7/2000 | Website |
| ☐ | Anon: JJJ | 12/6/2000 | Website |
| ☐ | Anon: GEDW | 12/6/2000 | Website |
| ☐ | Anon: HYH | 12/5/2000 | Website |
| ☐ | Anon: DFG | 12/5/2000 | Website |
| ☐ | Anon: FEEE2 | 12/5/2000 | Website |
| ☐ | Anon: FLWEELE | 12/4/2000 | Website |
| ☐ | Anon: EYEWEB | 12/4/2000 | Website |
| ☐ | Anon: JOHN SMITH | 12/4/2000 | Website |

Clear checkboxes
Groups                    Back to top

Fig. 13

Conventional Data Exchange and Functionality Control Model

Enhanced Data Exchange and Functionality Control Model

ENHANCED DATA EXCHANGE AND FUNCTIONALITY CONTROL SYSTEM AND METHOD

CROSS-REFERENCE TO RELATED APPLICATIONS

This application is a continuation-in-part of U.S. Non-provisional application Ser. No. 11/878,226, filed Jul. 23, 2007, which is a continuation of U.S. Non provisional application Ser. No. 09/779,456, filed Feb. 9, 2001 (issued as U.S. Pat. No. 7,249,190), which is incorporated by reference herein in its entirety.

FIELD OF THE INVENTION

This invention relates to the dedicated exchange of data between computing devices and controlling functionality of a computing device. More particularly, this invention relates to an enhanced data exchange and functionality control system and method that exchanges data and controls functionality of a computing device via messages received from a communications network.

BACKGROUND OF THE INVENTION

The Internet provides an extraordinary opportunity for exchange of information. The largest and most visible system is the use of web sites. People around the world who can access the Internet and who have a web browser can access and view information on almost any topic via a web site. This information can be rich in content such as text, graphics, photography, audio, video, etc.

The problem with these web site browsers is they do not all support the same rich content. For example, Microsoft MSN does not support advanced JAVA script but Netscape does. Therefore, if a web site has content using advanced JAVA script, it cannot be seen as intended on an MSN system.

Another issue with web site browsers, even from the same company, is that they are constantly updated with new features under new versions. Data designed using these new features cannot be seen on older versions.

With controlled access sites, data can be sorted and filtered even down to an individual's personal preference or profile. Again, the information comes from a large database that was programmed or posted in the public system for viewing. The web site is basically filtering and delivering a subset of that pre-programmed information to the individual.

E-mail via the Internet is also a known means of exchanging information. E-mail employs a public distribution system designed to deliver information to an individual or group which works very much like the public postal system. People on an e-mail system can send a message to almost anyone, if they know or can find out their e-mail address.

There are numerous e-mail systems available, such as Microsoft® Outlook Express, America Online, Netscape, etc. E-mail is designed to deliver common text messages and attachments within an agreed-upon protocol. Attachments are typically used to send non-text data to recipients. However, this information can only be viewed if the recipient has the software version required to execute upon the file format.

Some e-mail systems are now providing advanced features for sending photographs, voice messages and even HTML content. Most of the time these more advanced capabilities are difficult to use, and are therefore, seldom used. In addition, because these advanced capabilities are not built by standardized, system-wide protocols, they are not supported on other e-mail systems where the recipient sees a file that is reduced back to simple text.

There is another system supported on the Internet that is commonly referred to as network conferencing. These systems support a dedicated channel between one-to-one or one-to-many parties via the Internet. In a net conference, parties in different locations can exchange multiple types of data in a real-time environment. They support voice exchange, live video, and the ability to view and change common data that is being displayed on all computer screens involved in the conference. These systems require a strict compatibility of software brand and version on all machines involved in the conference.

Internet web sites, e-mail, and network conferencing systems for the most part work well for their intended use. On Internet web sites and e-mail systems, information is created and formatted and is then posted or sent to either a targeted or non-targeted audience. Network conferencing systems are useful for targeted situations and real-time exchange of information created during or before the conference begins. However, these systems fall short when they try to do each other's functions or work outside their intended use. Moreover, the current approach for installing and maintaining software on computing devices has become extraordinarily complex resulting in a multitude of systems being unable to recognize or execute upon many different data files otherwise available across a communications network. As such there is a need for an enhanced data exchange and functionality control system and method.

SUMMARY OF THE INVENTION

The present invention provides an enhanced data exchange and functionality control system and method where a first computing device provides a second computing device a message over a communications network (or communications link). Such a message is also referred to herein as a comlet or Comlet. The message includes partial executable code that merges with framework executable code previously present on the second computing device without changing the framework executable code. The partial executable code extends core functionality of the framework executable code as required to execute on data included in the message, on data included in a following message, or on data received from another source. A computing device may comprise, for example, a personal computer, a laptop computer, a personal digital assistant (PDA), a smart phone, a set top box, an automation control device, a field-programmable gate array (FPGA), an application-specific integrated circuit (ASIC), a programmable logic device, etc. and would typically include a storage device (e.g., memory, hard drive, etc.), a processing device, and an interface to a communications network.

A first embodiment of this invention enables the exchange of rich multimedia presentations and communications via a dedicated communications network connection, for example a dedicated Internet pipeline between agreeable parties. With this embodiment, one of the parties is associated with a client computing device and the other one of the parties is associated with a server computing device. Information is exclusively exchanged between these parties and outside parties cannot input information into this pipeline without explicit permission. The only exception to this rule is when an optional Hub is used in the middle of the pipeline to collect different types of data, to manage data exchange between the parties, to combine different types of data, and/or to enhance the data for a richer presentation/communication.

Under one arrangement, the primary party providing information initiates an encounter with another party who would like to carry on an exchange of information via this dedicated communications network connection. In a direct exchange, the primary party provides the receiving party with the software, or first executable code, to begin the exclusive exchange of information. The software can be delivered by giving the person a CD/DVD, a thumb drive, a floppy disk, an e-mail with the software attached, a web site location for the download, etc. Alternatively, the receiving party subscribes to the presentation/communication system by initiating an encounter with the primary party after discovering a web site, receiving a direct e-mail, hearing an advertisement on the radio or television, receiving an advertisement via the mail, etc. Regardless of how it was received, with this embodiment, the receiving party makes the initial decision to install an executable file onto the computer desktop to begin the communication exchange.

Once the receiving party selects to install the software, the executable file performs a number of initial installation functions, for example, establishing a dedicated pipeline for information exchange, enabling a scheduling function, downloading introductory information, etc.

The executable file loads a customized minimum framework for executing a viewer-type interface into the receiving party's computer storage device (e.g., memory, hard drive, etc.). The executable file also locates the receiving party's communications network connection (for example, an America Online connection, MSN connection, LAN connection, etc.) or a pre-defined Internet connection. Under one optional approach, it also links the receiving party's viewer-type interface to a Hub via the communications network using a dedicated URL associated with the Hub.

In addition to the viewer-type interface, an entry (a unique identifier) is automatically made into a database on the Hub that links the two parties for exclusive data exchange via this newly established pipeline. This pipeline will now download an introduction to the receiving party's computer. At the same time the primary party is notified that the receiving party has installed the software and the dedicated pipeline is established.

A scheduling program is then enabled that will later wake up the viewer-type interface and perform a two-way data exchange, which may be with the Hub. All new information from the primary party is downloaded at that time, and information from the receiving party is uploaded.

The executable program then creates a desktop icon on the receiving party's computer. The icon sends an alarm (flashing or audio) to the receiving party anytime new information is downloaded to their computer storage device. Therefore, at any time, the receiving party can click on the icon and instantly view large, sophisticated and rich multimedia presentations/communications from the storage device.

Under one arrangement, when the program assigns the receiving party a unique identifier, the Hub will recognize the identifier and deliver to the party whatever appropriate files are awaiting the party. Any time after the pipeline is established, the primary party can interact with the Hub to schedule and/or create information for distribution. The Hub will take different data types (such as jpg images, sound files, I/O programs, etc.) and combine them with the display code into a single file that can be executed upon by the receiving party's computer. Integrating the different types of data and combining them with the display code is done through a number of different programs called "TransLets" (Translation Applications). The resulting output file from a TransLet is a "Comlet" (Communication Application) which is downloaded to the receiving party's computer. This information will be transferred to the receiving party's computer automatically by the scheduler at specified intervals. Two-way information can also be exchanged through the Hub by using the scheduler or by directly clicking the transfer icon.

Although the particular kind of interaction between the parties can vary widely and remain within the scope of the present invention, the present system in essence establishes a dedicated communication link between the parties using a communications network as a delivery conduit. This system allows for robust multimedia presentations and communications to be enhanced and exchanged.

As a further aspect of the first embodiment of the present invention, the viewer-type interface residing on the recipient's desktop acts as a light framework for the execution of program files that are downloaded from the Hub. The viewer-type interface corresponds to a kernel which provides core viewer functions made complete by a program (comlet) received from the Hub. Specifically, the program, or comlet, comprises partial executable code that merges with the kernel to produce a completed comlet data viewer. The kernel is thus completely unlike a classic Internet browser which receives only content to be displayed via the established browser protocol. In accordance with the invention, the kernel becomes a completely different comlet data viewer depending on whatever program routines are pulled from the Hub. This methodology also eliminates any problem with incompatible viewers or out-of-sync versions because all the functionality required to display information is delivered in the Comlet.

Thus, the present kernel when merged with one Comlet can become a different comlet data viewer than when merged with a different Comlet. In other words, the kernel acts as a framework by which program routines (partial executable codes) can be sent from the Hub to the user to produce different comlet data viewers thereby enabling varied and robust presentation capabilities.

In a second embodiment of the invention, a first executable code, or program, comprising a framework, or kernel, having core functionality is provided to a computing device independent of a user request and without a user installation process. For example, the first executable code may be installed on a computing device as part of a manufacturing process or product assembly process. A second executable code, which is a partial executable code, is included in a message provided to the computing device via a communications network. The second executable code merges with the first executable code without changing the first executable code thereby providing functionality required to execute upon data that may also be provided in the message, provided in one or more following messages, or provided from another source such as a sensor. At a later time, different partial executable code can be provided to the computing device via another message where it will merge with the first executable code to provide different functionality required to execute upon different data that may also be provided in the message, provided in one or more following messages, or provided from another source.

Under one arrangement of the second embodiment of the invention, the computing device provides a user an interface for requesting data. If the executable code present on the computing device does not have the functionality required to execute upon the requested data, a message is provided via the communications network that includes partial executable code that merges with the first executable code to provide functionality required to execute upon the requested data. One or more messages having the requested data is provided to the computing device via the communications network.

Under another arrangement of the second embodiment of the invention, the computing device receives partial executable code to establish or modify the desired functionality of the computing device. A control facility is used to manage the executable code on the one or more computing devices as necessary for the computing devices to be able to execute on data to be provided to them via a message or another source.

Various combinations of the first and second embodiments can be employed as alternative embodiments of the invention. In one alternative embodiment, first executable code having core functionality is provided to a computing device, whereas with the first embodiment the user of the computing device can request data that results in a message containing partial executable code being provided to the computing device to merge with the first executable code as required to execute upon the requested data, where as with the second embodiment a control facility may also independently provide first executable code and/or partial executable code independent of a specific user request.

In another alternative embodiment, a control facility manages functionality of one or more computing devices, in which case messages containing partial executable code merge with kernel executable code resident on the one or more computing devices to establish or modify the functionality of a system being controlled. The control facility manages the functionality on the one or more computing devices as necessary for the computing devices to be able to execute on data to be provided to them via a message or another source. One of various methods can be employed to provide feedback (or input) to the control facility from the computing devices. Under one approach, one or more sensors may monitor one or more parameters associated with the environment of a system associated with one or more computing devices, or of the system itself, or of one or more of the computing devices. Based on the sensor information, the control facility may send a message having new partial executable code to a computing device where the new partial executable code will merge with kernel executable code to vary the functionality of the computing device or of the system being controlled by the computing device without permanently changing the kernel executable code on the computing device and without changing the environment of other messages sent prior or subsequent to the message. In other words, the control facility can provide a first partial executable code to extend the kernel functionality as required to enable a first functionality of the system and a later time provide a second partial executable code that essentially replaces the first partial executable code when it merges with the kernel executable code as required to enable a second functionality of the system.

In a still further alternative embodiment of the invention, a first executable code having core functionality is provided to a computing device, where the core functionality is able to request a message providing partial executable code (i.e., new functionality) in accordance with sensor information corresponding to the environment of the computing device, measured user tendencies, or other measured parameters, and able to apply rules and established boundary conditions so as to request messages having partial executable code considered appropriate to the circumstances.

DETAILED DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompany drawings, of which:

FIG. 1 is a schematic representation of a prior art content delivery system;

FIG. 2 is an example content delivery system in accordance with a first embodiment of the present invention;

FIGS. 11 through 14 are client screens within the command center of, for example, FIG. 10 in accordance with the first embodiment of the present invention;

Figure 15A:
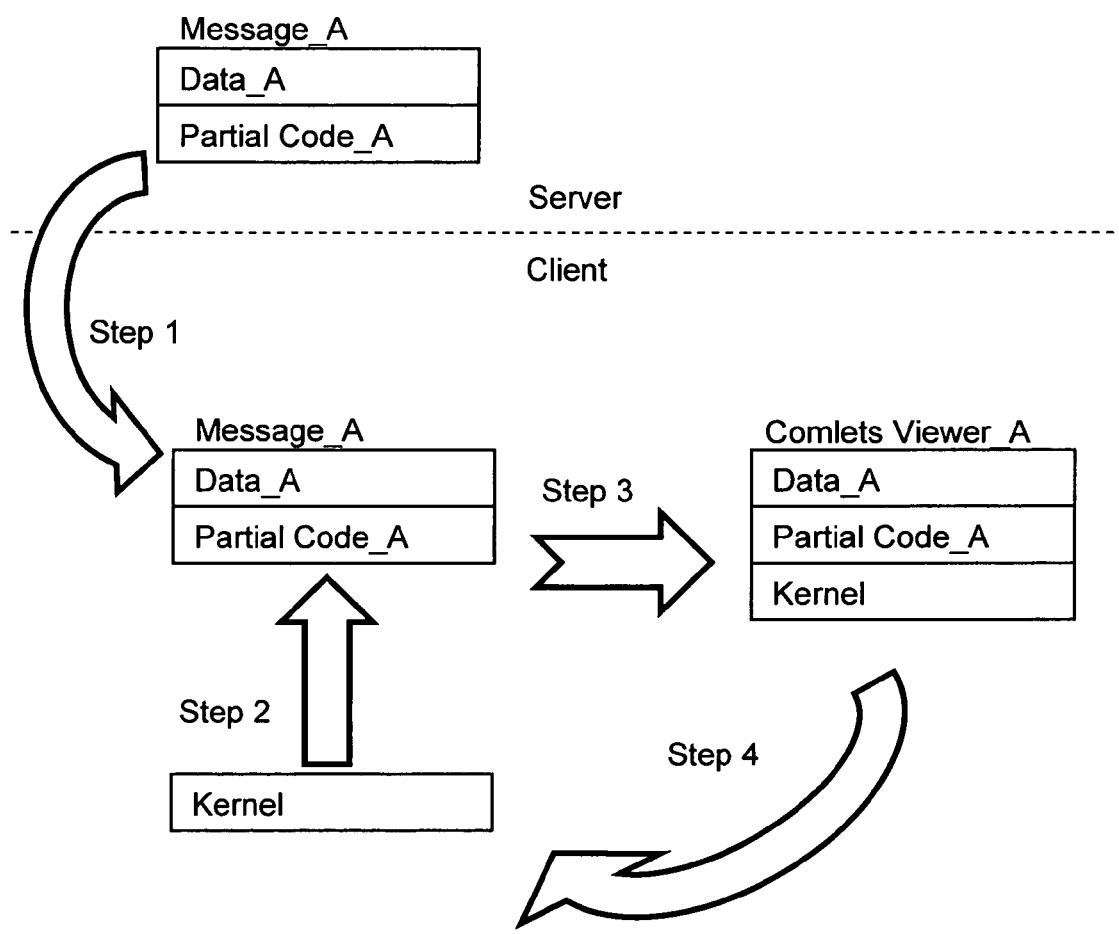
Figure 15B:
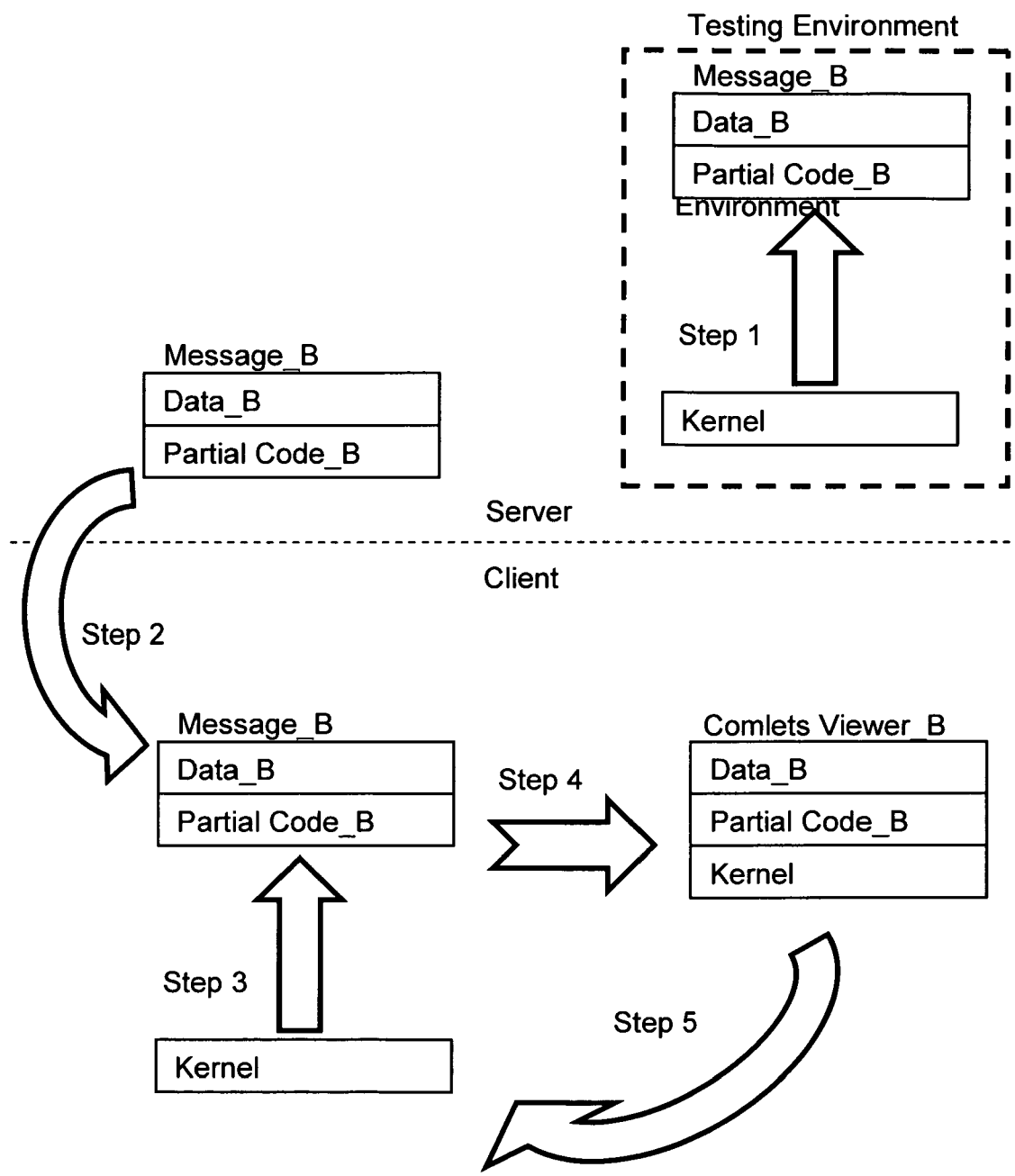
Figure 16:
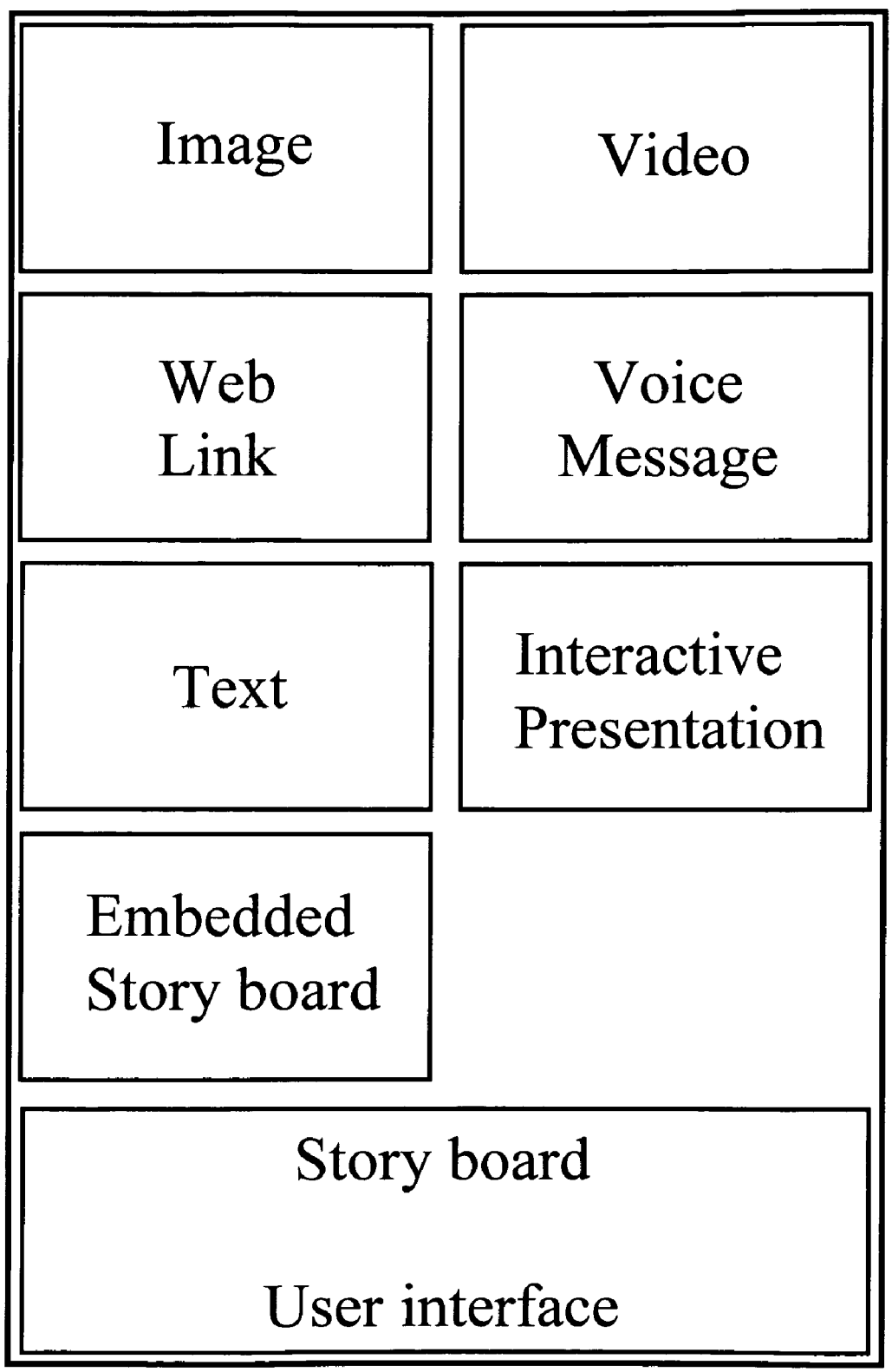
Figure 17:
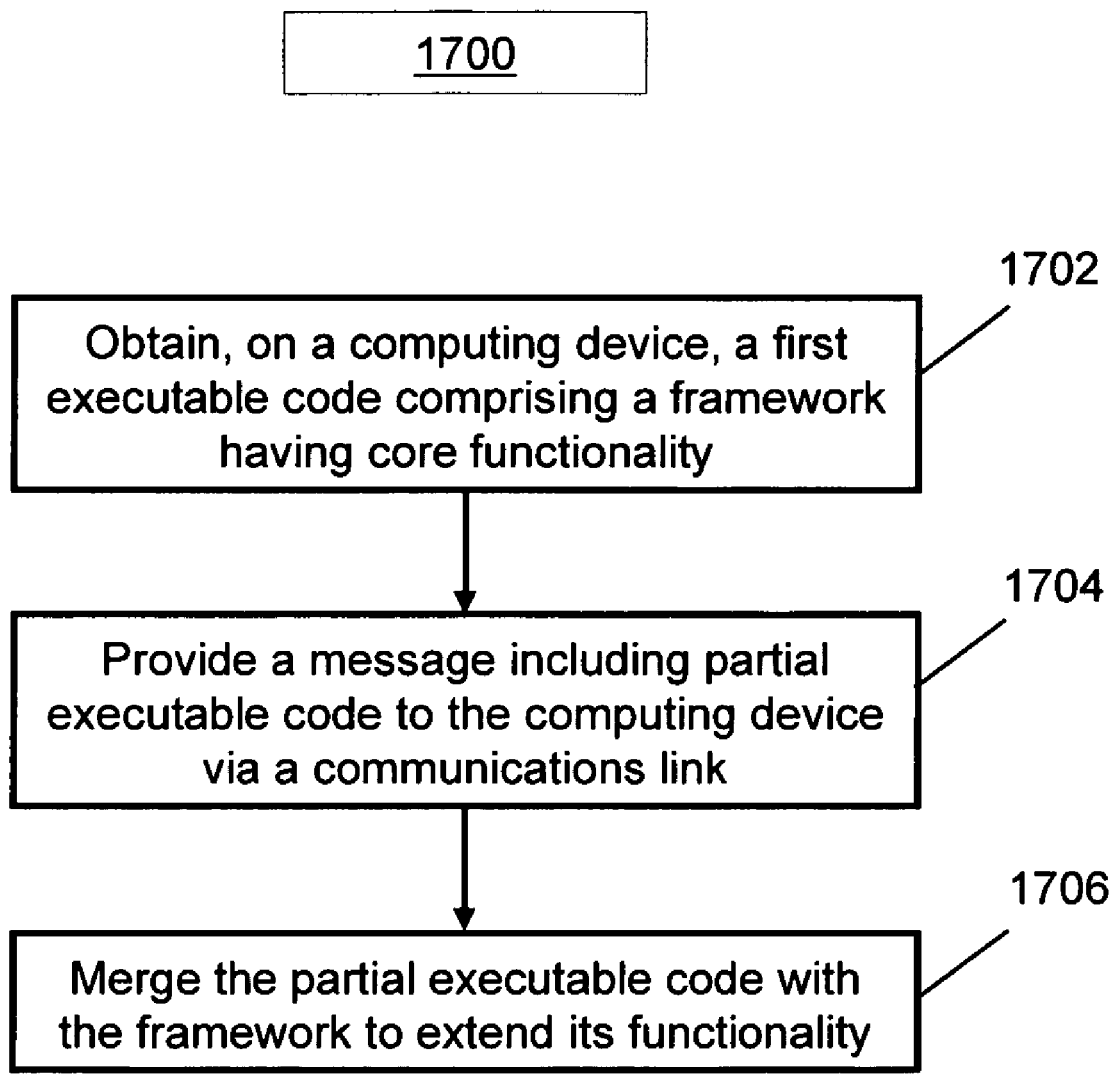
Figure 18A:
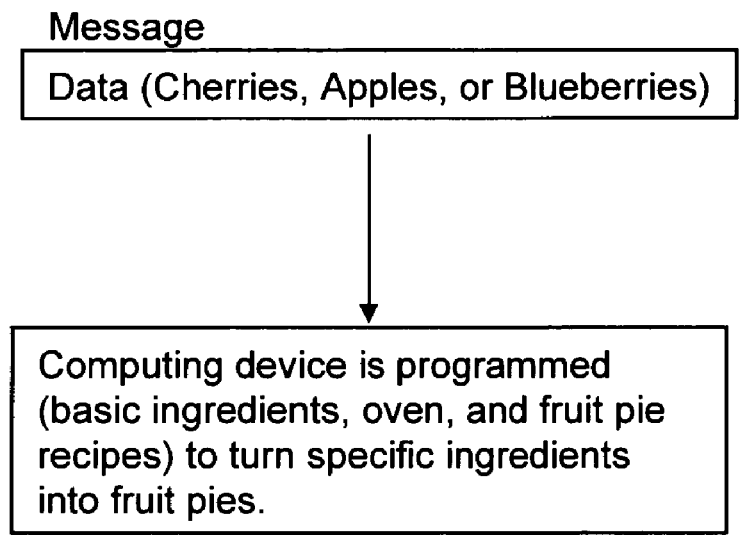
Figure 18B:
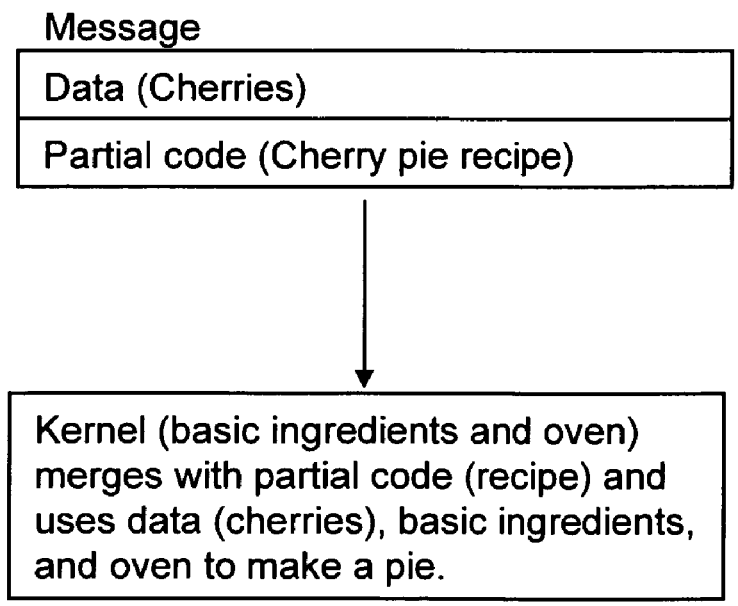
Figure 19:
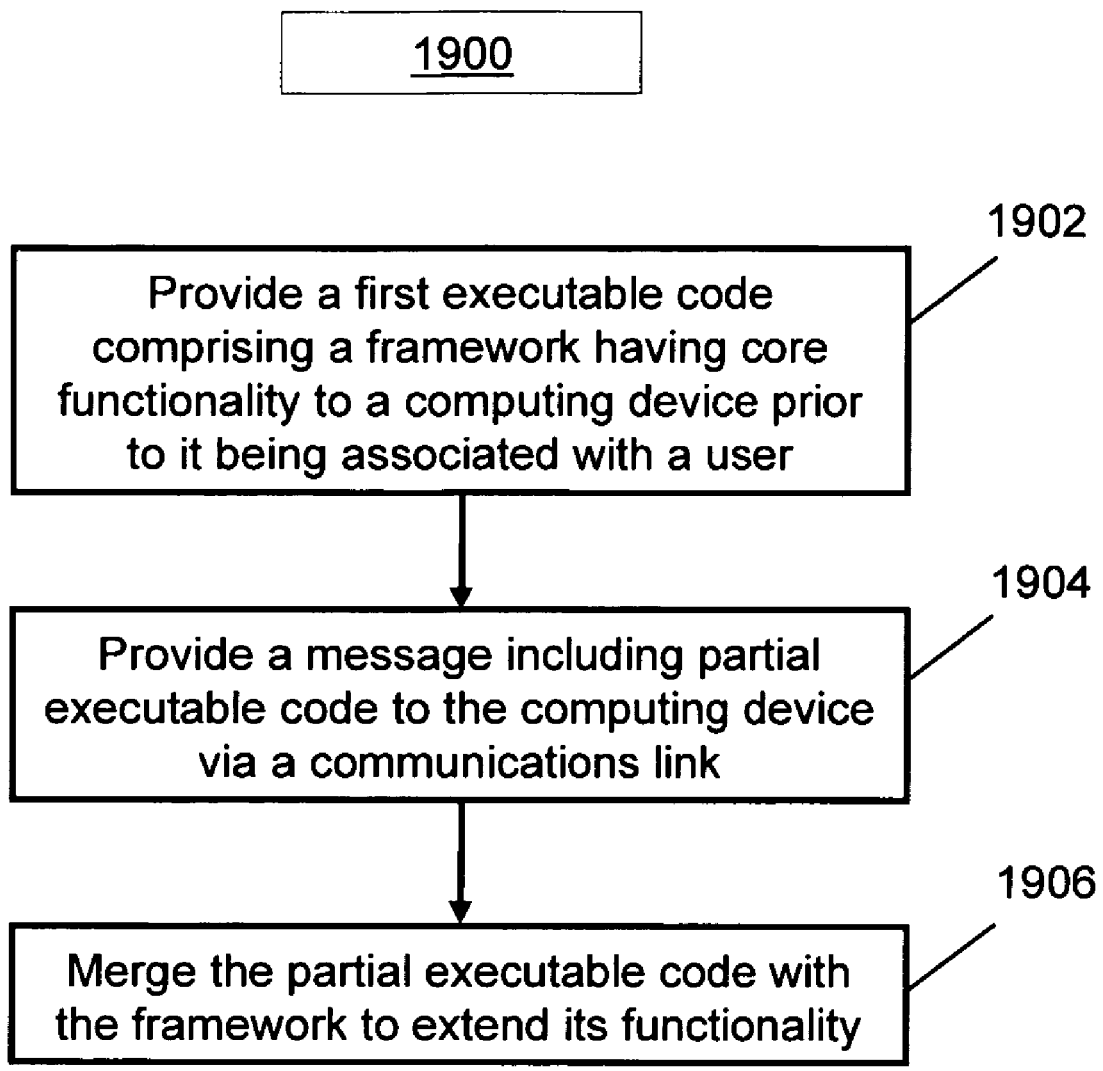
Figure 20:
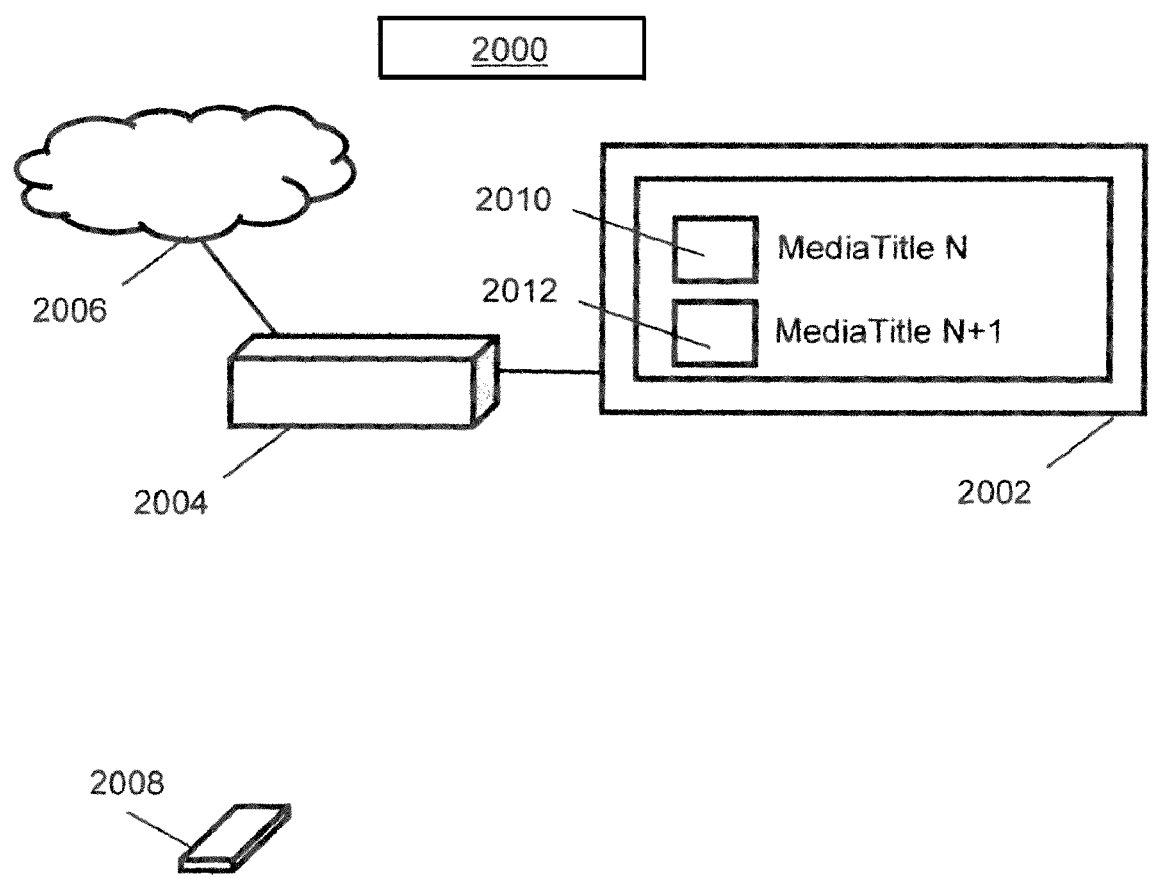
Figure 21:
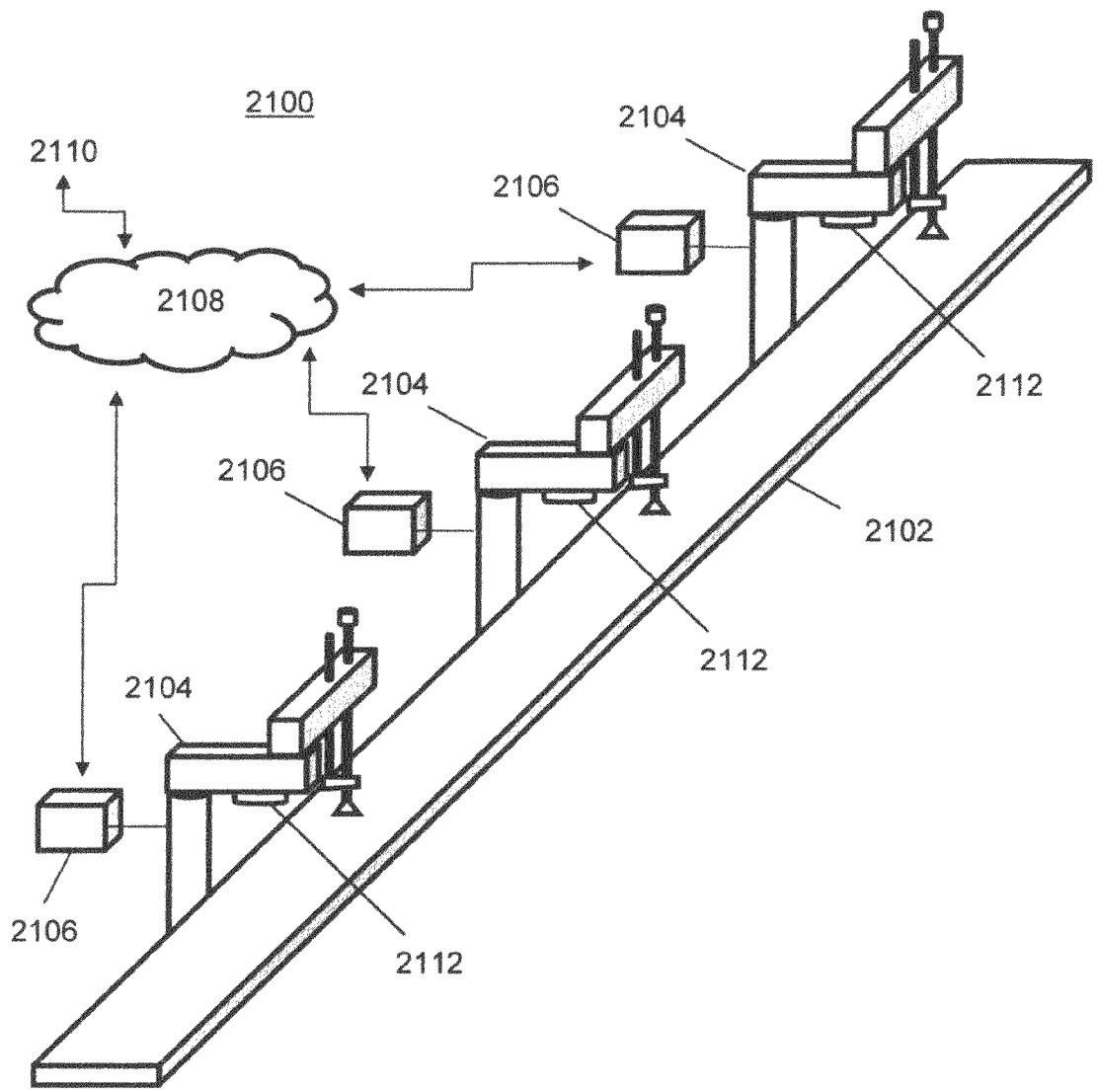

FIG. 15*a* depicts an exemplary message and merging of a kernel with partial code in accordance with the first embodiment of the present invention;

FIG. 15*b* depicts and exemplary testing environment in accordance with the first embodiment of the present invention;

FIG. 16 depicts example content of a message corresponding to a mixed media presentation;

FIG. 17 illustrates an example method in accordance with the present invention;

FIGS. 18*a* and 18*b* depicts a pie making analogy that compares the data exchange and functionality control model of the prior art and the enhanced data exchange and functionality control model of the present invention;

FIG. 19 depicts another example method in accordance with the present invention;

FIG. 20 illustrates an exemplary set top box scenario in accordance with the second embodiment of the present invention; and FIG. 21 depicts an example assembly line having robotic arms controlled by automation control devices in accordance with the second embodiment of the present invention.

DETAILED DESCRIPTION OF THE INVENTION

The present invention provides an enhanced data exchange and functionality control system and method where a first computing device provides a second computing device a message over a communications network such as the Internet. The message includes partial executable code that merges with framework executable code previously present on the second computing device that provides core functionality. The partial executable code extends the functionality of the framework executable code as required to execute on data included in the message or on data included in a following message. In other words, the extended functionality may exist only for the duration of a message or may exist for some other extended period of time as controlled by the provider of the partial executable code, which for certain applications may be as controlled by the requester of the partial executable code. As such, the present invention involves partial executable code contained in a message sent to a computing device via a communications network, where the partial executable code is merged with a first executable code so as to extend the functionality of the first executable code to enable the computing device to execute upon data contained in the message, contained in a subsequent message, or from another source regardless of what other programs are present on the computing device, their configurations, versions, etc.

By providing partial executable codes that enable a framework executable code to execute upon any data contained in a message a computing device receives, the present invention addresses many of the shortcomings of the prior art expressed above. Additionally, the present invention enables computing devices to support an extensive variety of applications without having to have all supporting software previously loaded on the computing device, which can require significant media storage and memory resources. As such, the present invention supports a wide variety of applications where a computing device having a framework executable code and an appropriate amount of data storage/memory/hard drive capacity can request messages that enable it to perform various desired functionality and/or the framework executable code can in certain applications be requested (or commanded) to take on new functionality as necessary to perform a desired task or otherwise execute upon a new data format. This flexible and efficient approach for exchanging data and partial executable code provides a new paradigm for how computing devices can be designed, configured, and supported. The present invention enables users to deliver high quality presentations/communications information over a communications network. The present invention also enables delivery of a comprehensive variety of media over various other types of networks such as phone networks, television networks, etc. and enables successful delivery and execution of media to large numbers of computing devices having minimal resources and without traditional concerns of software versions, configuration, etc. Moreover, the present invention can be used to more efficiently maintain functionality control capabilities in a wide variety of automated and semi-automated environments due to its decoupling of executable code able to execute upon data provided via the communications network or via another source.

A first embodiment of the present invention provides a direct link between two parties on a public network, enabling a business-to-consumer communication in which the consumer receives, for example, very high resolution images and product presentations that he requests, without encountering typical problems associated with the Internet including the receipt of unwanted messages, viruses, etc. In the preferred embodiment, a consumer gives initial permission for the present invention to be loaded onto the desktop of the user's computer by, for example, running a CD, downloading an Internet file, downloading an e-mail application, etc. Thereafter, when the user clicks on an icon located on the desktop, the user receives, for example, very high resolution images and product presentations that have been pre-selected for the user by a business entity. The present invention provides substantially improved levels of communication between businesses and potential/existing customers, while giving the consumer the freedom to engage themselves in the marketing environment at their leisure (as consumers have become accustomed to doing on the Internet).

This first embodiment of the present invention is a substantial improvement over traditional e-mail systems because it establishes a dedicated link between the consumer and the business. Traditional e-mail has become a large junk-mail box, filled with unwanted and many times undesirable messages. Because e-mail is a free service, it is open for anyone to send anything to anyone else (including viruses). The ability to use e-mail as a dialog mechanism between a consumer and a business which have previously determined that they want to engage in business or marketing exercises is a poor choice due to the saturation of the e-mail environment. Further, e-mail is limited as a medium because it delivers simple text messages. Although some computer savvy individuals have employed the e-mail environment to produce quality multimedia presentations, those users are constrained by the computer configurations and program versions that exist on their recipient's computers. Generally, in such cases unsafe data attachments are provided to a recipient through email. Such data can only be viewed if the required applications (and application versions) reside on the computer and such data frequently contain viruses and other undesirable material, etc. As a result, users are understandably apprehensive about opening such e-mails. In contrast, the first embodiment of the present invention delivers partial code and data from a trusted source that extends the incomplete viewer code to present the data without requiring external software or software updates, and without placing unknown data on the computer.

The World Wide Web compensates for many of e-mail's shortcomings. On the web, one can find information on almost any topic, even in the form of impressive multi-media presentations. As with e-mail, however, a person must have a reasonable knowledge of computer programming and an artistic flare in order to create and deliver an impressive presentation on the web. Although authoring tools exist that make it easier for individuals to develop web sites, web site building is a skill that the average person does not possess. Furthermore, web sites do not lend themselves to customization for individual consumers, but instead transmit information using a one-to-many model.

As shown in FIG. 1, the prior art user computer 10 will employ an operating system 6 with a browser 4, an Internet connection (IX) 3, and a viewer application 5 associated with the browser 4. When the user of the user computer 10 desires content 2 from a server 1 via the Internet 15, the browser 4 requests the content file 2 and the server 1 delivers the content file 2 through the Internet connection 3 to the browser 4 of the user computer 10. In the embodiment of FIG. 1, the content file 1 must follow a format that is understandable by the browser 4. That is, the browser 4 provides all of the executable files necessary to create a viewing environment for the user, and simply needs the data content 2 desired to be displayed. Of course, different formats of content 2 can be viewed at the user computer 10 by installing viewer plug-ins 5 of various application types. Each viewer plug-in 5 is able to render one or more different types of content in particular formats.

On the other hand, the first embodiment of the present invention uses a completely different methodology for viewing content from a communications network. As shown in FIG. 2, the computer 10 has a standard operating system 6, a standard network connection 14 providing connectivity to a communications network 15, and (optionally) a standard browser 13. In accordance with this example embodiment, a kernel program 12 provides a base level framework for creating high quality multimedia presentations on the monitor associated with the computer 10. The kernel itself is not a complete viewer program 5, but will only be completed when it receives partial executable program code, for example from the Hub 16, in accordance with the descriptions that follow.

The Hub 16 creates so-called comlets 17 which consist of content data together with partial executable program codes. The comlet 17 is thus much more than a simple content package like that shown in FIG. 1 since it contains not only data for display, but includes partial executable code needed to complete the base level framework code to create the comlet data viewer environment on which the content will be displayed.

Once the comlet 17 is communicated by the Hub 16 through the communications network 15 to the computer 10, it is executed in the kernel 12 in order to create the full viewing multimedia environment on the user monitor associated with the computer 10. As can be seen in a comparison of FIGS. 1 and 2, the computer 10 in accordance with the first embodiment of the invention described does not have a viewer 5 resident. This is advantageous because eliminating the viewer 5 from the computer 10 eliminates the constraint that the content 2 provided must conform to the protocols and formats understandable by the viewer 5. In the example embodiment, the kernel 12 need never understand the format, protocol, etc. of the content 2 of the comlet 17 because the partial executable code being delivered with the content 2 in the comlet 17 is tailored to the format, protocol, etc. of the content 2 to enable the created comlet data viewer to execute on the data of content 2.

Thus, one can envision the kernel 12 as having a core viewer functionality (i.e., setting the stage for the creation of a comlet data viewer), which core functions are then modified, enhanced, rewritten, etc. as necessary by the program code contained in the comlet 17. The comlets 17 that are downloaded are themselves partial programs (similar to an .EXE file that may also require one or more .DLL files) which are executable by the computer 10 in the context of the framework of the kernel 12. By analogy, the kernel 12 is similar to the .DLL file that allows the comlet (.exe) program to run. One can thus see that the capabilities of the computer 10 to create the multimedia presentations for the subscriber are no longer constrained by the capabilities of a standard Internet viewer or browser. Since the kernel 12 provides only the framework by which the comlet code will be executed, there are no longer any viewer capabilities, file capabilities, etc. which constrain the operation of the viewer that is ultimately produced by the comlet execution.

The invention of FIG. 2 thus operates substantially differently than the prior art of FIG. 1. In the prior art of FIG. 1, the browser understands only a fixed protocol (for example ASCII, HTML, JAVA, etc.) and outside that protocol it will not work. Further, the browser cannot extend itself with new capabilities, but is limited to the capabilities programmed into it until the entire browser functionality is upgraded to support new capabilities. Of course, one can download a new browser or an updated browser program into the user computer via the Internet from a browser provider, but the new browser will suffer the same problems in that it cannot perform outside of its fixed specifications and capabilities.

The general operation of the kernel 12 will now be described. As shown in FIG. 2, the kernel 12 and appropriate comlets 17 are resident on the hard drive 18 (or other storage device) of computer 10. During the installation process, the kernel 12 connects to the communications network 15 (via the network connection 14), establishes a unique subscriber ID (cookie) from the Hub 16, and then downloads some default "welcome" comlets 17 onto the hard drive 18. It then disconnects from the Hub 16 and runs the comlet data viewer created by operation of the kernel 12 in conjunction with one of the downloaded comlets 17.

Unlike a traditional browser 4, the user of the present invention is not required to connect to the communications network 15 by invoking a viewer 5. Instead, a user may run comlet data viewers corresponding to comlets already resident on the hard drive 18 of the computer 10.

New comlets 17 are loaded onto hard drive 18 by one of two operations. First, the user can explicitly request new content by clicking on an update button contained on the comlet data viewer frame. Then, an Internet connection is created if necessary, causing the kernel to request new content (if any) from the Hub. Also, the kernel 12 runs a background daemon that checks for periods of inactivity, and then periodically automatically connects to the Hub to see if any new comlets 17 are available for the user. The idea is to not make the user wait, but have new content preloaded before he sits down at the computer.

Therefore there are three unique times when the kernel 12 connects to the Internet 15: 1) during the installation process to obtain a unique subscriber ID, 2) at the request of a user while he is running the comlet data viewer, and 3) at the request of the daemon at a predefined time to check for new content.

A comlet data viewer created by the kernel 12 in conjunction with any of the comlets 17 is commercially and herein referred to as the Comlets (formally BeeZip) Viewer. With the Comlets Viewer of FIG. 2, the kernel 12 is a lightweight framework for the content 17 to express its self by whatever protocols and whatever instructions are provided in the program code associated within the comlet 17. The comlet 17 is thus adding partial executable code (executable programs) to the kernel 12, which the kernel 12 uses to extend its own capabilities beyond that which were otherwise programmed into it. Thus, each comlet 17 not only defines its own content, but also the presentation by which the content will be rendered. In some instances, the content and Comlets Viewer program code in the comlet 17 will be a complete software Comlets Viewer program in and of itself such that when new comlets 17 are provided by the Hub 16, the kernel 12 can create a wholly different Comlets Viewer than was previously rendered.

Figure 3:
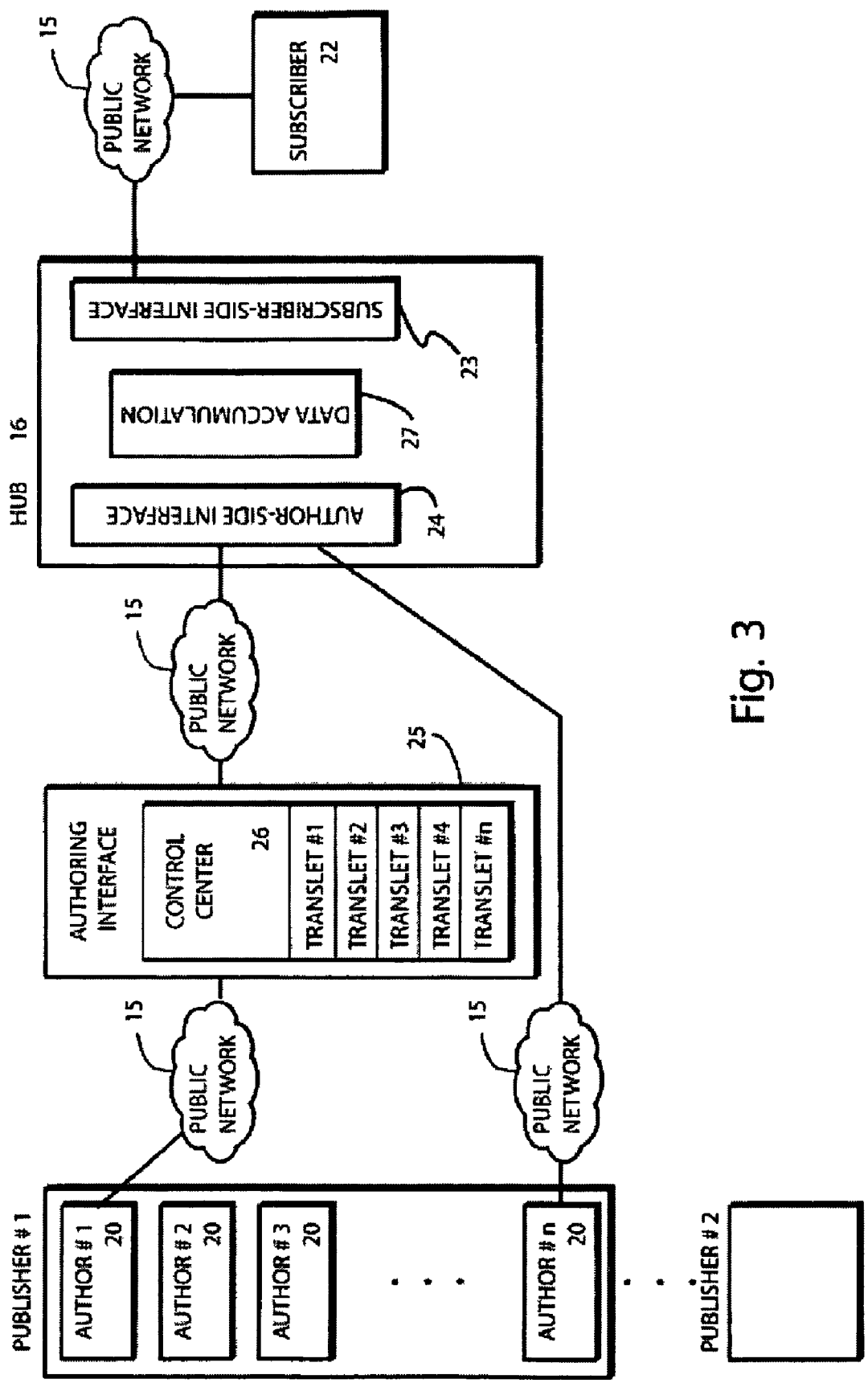
FIG. 3 is a schematic representation of an example content delivery system in accordance with a first embodiment of the present invention.

The comlets 17 are creative in and of themselves, but they become even more useful within the context of the system of FIG. 3. FIG. 3 illustrates a system of three Internet entity types: authors 20 which will typically be employees of a publisher (i.e., any business entity or other entity), the Hub 16 (see FIG. 2), and the subscriber 22 (who will be working typically on the user computer 10 of FIG. 2). The Comlets Viewer described previously with respect to FIG. 2 will ultimately exist on the subscriber 22 computer. The Comlets Viewer supports a wide variety of media, including high-quality graphics, photographs, e-mail, music, voice messages, video, interactive programs, etc., all depending solely upon the type of viewer program code provided in the comlet 17 delivered by the Hub 16. Also, for each publisher, a different kernel might be installed on the associated subscribers' computers. The kernels are stored in different folders, and are completely independent of each other both functionally and conceptually. Each kernel may have an embedded knowledge of the business entity to which it communicates. Although only one Hub 16 is shown in FIG. 3, many Hubs can be employed. Each business can operate on different or common Hubs. Each business has a unique URL that identifies it to whichever Hub(s) it is employing. The aspects of the Comlets Viewer on the subscriber 22 computer 10 are shown in greater detail, for example, in FIGS. 5-9.

A further entity of the system of FIG. 3 is the Authoring Interface 25, which may be separate as shown in FIG. 3 or may be an application resident at the publisher, author 20, or Hub 16. The author interface coordinates the translation of raw information from the authors 20 into comlets 17 via appropriate translet routines. The authoring facility further includes a control center 26 which coordinates the submission and distribution of comlets to appropriate subscribers 22.

The Hub 16 includes a subscriber interface 23 which interacts with the various subscribers 22, usually by a public network. Although the subscriber interface 23 communicates with the subscribers 22 typically through a public network, such as the Internet, subscriber interface 23 establishes a dedicated communication link with the subscriber 22 as a result of the unique operation of the example embodiment. That operation begins with the subscriber 22 voluntarily electing to create the dedicated connection to an author (actually to the Hub 16 but from the subscribers' perspective, to the author).

The installation sequence takes place as follows:
1) The kernel copies program files to the hard disk.
2) An icon is placed on the desktop.
3) A connection to the Internet is established.
4) A Unique Subscriber ID is obtained from the Hub given from the kernel's embedded URL.
5) A set of default comlets (generally "welcome" comlets) are downloaded to the user's machine.
6) The connection is dropped if necessary (like a dialup).
7) The connection scheduling daemon is started (invisible to the user). It is restarted at each boot-up (invisible to the user).
8) Upon user selection, the viewer is started and shows the comlets that are available to browse.

After the installation, the user should notice that from time to time (hopefully every day or two), the desktop icon shows that new content has arrived. By clicking on the icon, new content is available for browsing. The user can also manually check for new content if he suspects he has new content ready for him.

The creation of the dedicated channel can be described in an example such as where a realtor makes a personal contact with a potential homebuyer and thereafter wishes to maintain close communication with the prospect within the example system. In such a case, the realtor may hand the subscriber 22 a CD that has an executable file. When the subscriber 22 runs the CD in the computer 10, the computer is instructed to perform the above-described tasks.

When the subscriber clicks on the icon, the Comlets Viewer (from the hard drive kernel and welcome comlets) appears. From the subscriber's viewpoint, the subscriber has simply clicked on a logo and instantly entered a Comlets Viewer environment associated with the entity whose logo was on the subscriber's desktop even though the user does not necessarily have an instant/active connection to the Internet. Thus, it appears to the subscriber that the subscriber has initiated a direct business-to-consumer contact between the business entity and the subscriber. In reality, however, the kernel 12 previously communicated with the Hub 16, which made the appropriate identifications of the subscriber and the publisher/author initiator so as to return the appropriate content to the subscriber 22 in accordance with the logo selected, loaded comlets onto the hard drive and ran the kernel/comlets upon initiation by the subscriber 22.

Figure 4:
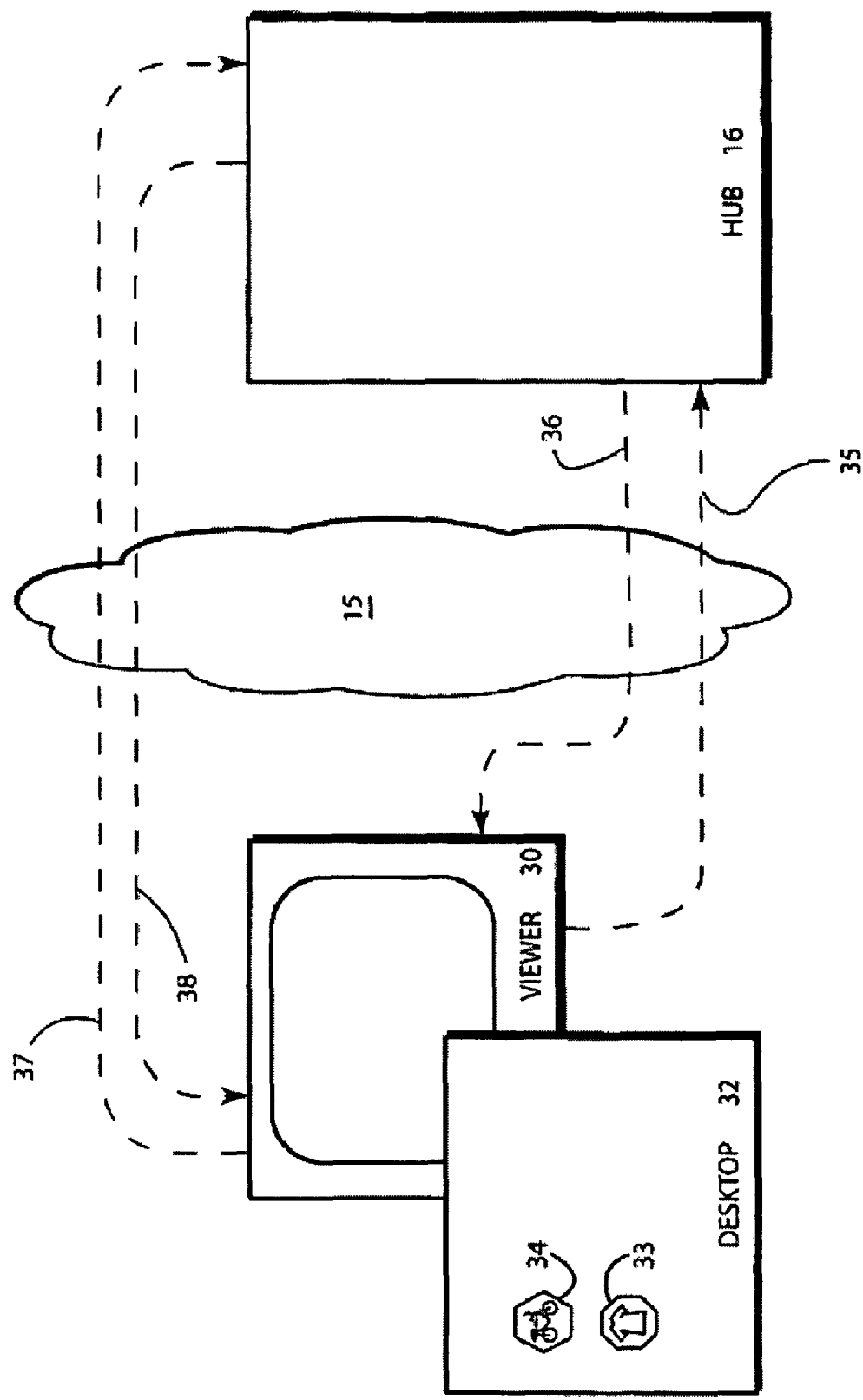
FIG. 4 is an example user desktop and comlet data viewer in accordance with the first embodiment of the present invention.

This feature is more particularly shown in FIG. 4 where the subscriber 22 has downloaded two different comlets onto their computer 10 corresponding to two different Comlets Viewer 30 entities. In this case, one icon is associated with a clothing manufacturer (icon 33) and the other is associated with a motorcycle dealership (icon 34). When the user clicks on icon 33, the comlets associated with the clothing manufacturer are run from the hard drive thereby appearing to the subscriber as a Comlets Viewer 30. The clothing manufacturer kernel will also from time to time coordinate with the Hub 16 to receive new clothing manufacturer comlets, as directed by the author 20. When the Hub 16 receives a message 35 from the kernel associated with the clothing manufacturer, it knows the identity of the subscriber 22, and the identity of the clothing manufacturer associated with that kernel. At that time (the Comlets Viewer 30 may or may not be active), the Hub 16 returns all of the comlets 17 in a message 36 to the kernel for downloading to the hard drive 18. Then, the next time the subscriber 22 clicks on icon 33, new clothing manufacturer content/Comlets Viewer will be ready on the hard drive for execution.

On the other hand, if the user clicks on the icon 34, the kernel associated with the motorcycle manufacturer will run the pre-loaded comlets associated with that manufacturer. Similarly, that kernel will also send, from time to time, message 37 to the Hub 16 (also via the Internet 15) identifying the motorcycle dealer associated with icon 34 (as opposed to the clothing manufacturer associated with icon 33) and the subscriber 22 identity. The Hub 16 therefore knows the subscriber and the motorcycle dealer and returns message 38 with appropriate comlets to create the Comlets Viewer 30 associated with the motorcycle manufacturer. The next time the subscriber 22 clicks on icon 34 it will run the Comlets Viewer 30 associated with the motorcycle manufacturer. One can see that a subscriber may load onto their desktop a number of Comlets icons which will each run a substantially different Comlets Viewer 30, depending on the particular icon selected. Thus, the Comlets Viewer 30 may see rich graphics associated with a clothing catalog if the user selects the clothing icon 33, but may see high quality photographs of motorcycles at a dealership if the user selects the motorcycle icon 34. Further, the Comlets Viewer itself can be modified to reflect a completely different kind of viewing environment tailored to the motorcycle or clothing content presented. The Comlets Viewer 30 created by the system is thus completely tailored to the particular content being delivered.

Returning to FIG. 3, one can see that publisher #1 and publisher #2 can have a number of associated authors 20 that communicate with the subscriber 22 (and other subscribers as well). Further, each publisher can place an icon on the subscriber 22 desktop 32, provided the subscriber 22 grants permission for the icon to be placed there (by loading the software via CD, Internet download, etc.). Once the icon is placed, the subscriber 22, the associated author 20, the publisher associated with the author 20, etc. are all identified by the Hub 16 as desiring the dedicated channel of communication. The identification of each of the entities associated with a particular icon can be embedded information in the URL request initiated by the computer 10 via the Internet connection 14, such as is presently accomplished using so-called "Cookies."

The Hub 16 includes an author-side interface 24 to interact with each of the authors 20 (possibly via an authoring interface 25) and a subscriber side interface to interface with the many subscribers 22.

The authoring interface 25 allows the authors 20 to custom tailor information that will be received by their respective subscribers using the screens shown in FIGS. 10-14 and described below. A control enter 26 coordinates the receipt of instruction from authors 20, delivery of comlets to the data accumulation routine 27, and the creation of comlets from raw material received from the authors 20. The Command Center 26 may alternatively reside on the Hub 16 or on the author computers, although it is conceptually and functionally independent of the Hub 16 and authors 20. The authoring interface 25 in FIG. 3 also includes a variety of functional routines that assist the client authors in creating the robust messages sent to the subscriber 22 in order to create the Comlet viewers 30. The authoring interface 25 can translate primitive information (simple text, images, music, etc.) into a final presentation to be seen by the subscriber 22. Ordinarily, client authors have neither the time nor the desire to write the program code described above with respect to the comlets 17. Accordingly, the authoring interface 25 translates simple primitive data received from the client author into the robust final information viewed by the subscriber 22 by converting the content received by the client author into the content plus programmable code associated with the comlets 17. Standard routines for taking, for example, text and converting into a robust letter presentation, are pre-programmed as the various translets 1-*n* shown in FIG. 3. In one example, the authoring interface 25 takes the primitive data submitted by the author 20 and places it into a template that creates a final presentation code that can be employed by the subscriber 22 computer 10 to execute the Comlets Viewer 30. Using the author interface 25, very little work is required of the author 20, except to provide the base content to be delivered to the subscriber 22 in the format of the robust presentation desired.

The authoring interface 25 is not limited to receipt and translation of text or images. In the text example embodiment, an author 20 may send raw basic text to the authoring interface 25 for translation into a robust business letter graphic. But the authoring interface 25 is not limited to just text type translations. The authoring interface 25 permits the author 20 to use music, voiceovers, audio, graphics, text, videos, montages, collages, etc. to present the raw data provided by the author 20 in a robust form to the subscriber 22. In each case, the authoring interface 25 accepts the primitive information from the client author 20 (via the Internet, telephone, etc.) and loads it into a template which is then translated into the appropriate program codes to instruct the kernel 12 to render the Comlets Viewer 30.

A translet does the following:
1) Converts raw data into appropriate internal formats and sizes. For example, the user may submit a raw image in .bmp format, and the translet may scale, enhance, annotate, and change the image into another format before compiling it into a translet.
2) Creates program code in some instances to deal with the variable input that may be received in the composition phase.
3) Compiles the translated raw data, generated program code, template code, and template media into a final comlet.

The command center 26 and Translets can be either web-based applications or traditional computer-local applications. The command center 26 may contain some translets, such as the letter comlet translet (because it is so generic). However, other more specialized translets (like a home tour translet) would be more appropriate outside of the command center 26 because it is very specialized.

The Hub 16 is responsible, primarily, for accumulating comlets for delivery to/from the subscriber 22, when the kernel 12 makes a next connection to the Hub 16. As previously described, connections are initiated by either the subscriber 22 at the timing desired by the subscriber 22 or at regular events initiated by the kernel 12. Content which the author 20 has instructed the Hub 16 to prepare in anticipation of a next access by the kernel 12 is maintained in the data accumulation entity 27, which accumulates information for the subscriber 22.

The example system of the first embodiment of the invention is substantially better than existing data mining systems because, prior to any substantive interaction with the subscriber 22, the Hub 16 learns exactly who the subscriber is and exactly which publisher from which the subscriber has requested a dialog. A new subscriber may even be unaware of which author or authors are generating and sending content to him, at least early in the dialog. Likewise, when he generates a reply to the author, he doesn't necessarily know which author or authors might receive his reply.

The data accumulation entity 27 records for the author 20 each instance in which the subscriber 22 initiates contact with the publisher associated with the author 20, the time of such access, the requests made by the subscriber, the downloads provided to the subscriber, replies made by the subscriber, etc. This accumulated data enables the Hub 16 to identify subscribers that do not access the viewer entity for a pre-determined period of time. Thus, a subscriber 22 who loads a realtor's kernel into their computer and makes an initial connection to the Hub 16 can be directly contacted by the author 20 if the Hub 16 notifies the author 20 that the subscriber has not communicated with the Hub 16 for a period of a certain number of weeks (for example). Thus, the Hub 16 is able to accumulate data both on what the subscriber does, and does not do, in association with the Hub 16. Further, the Hub 16 can automatically provide callups to the authors 20 when the subscriber's owned by the publisher do not hear from the subscriber. In such cases, an author 20 can automatically notify the Hub 16 that, after a pre-determined period of inactivity, the subscriber 22 is to receive a custom graphics viewer containing a follow-up letter from the author 20.

In general, because a subscriber may download a kernel from the Internet or obtain it through a mass distribution of CD ROMS, the subscriber must necessarily initially receive generic welcome content from the publisher. However, if the author meets the subscriber before the installation and they agree on a username, then the author can replace generic content with specific content tailored for the subscriber by "pre-registering" the subscriber before the subscriber installs the kernel.

Such interaction between the author 20 and the subscriber 22 (each operating at their own respective pace) is provided as a result of the dedicated channel and robust media presentations enabled by the present invention.

FIGS. 5-9 are example Comlets Viewer screens. As one can see from just a cursory review of these examples, the information presented is substantially more robust than could be provided in an e-mail environment. Further, the Comlets Viewer screens shown in FIGS. 5-9 are each customizable to a publisher such that the Comlets Viewer screens can be completely different for one publisher versus another publisher, completely without regard to the applications (including the kernel 12) that reside on the computer 10. FIGS. 5-9 are thus examples to illustrate how the kernel 12 and/or comlets 17 create high resolution Comlets Viewer screens via a dedicated channel to the subscriber.

Figure 5:
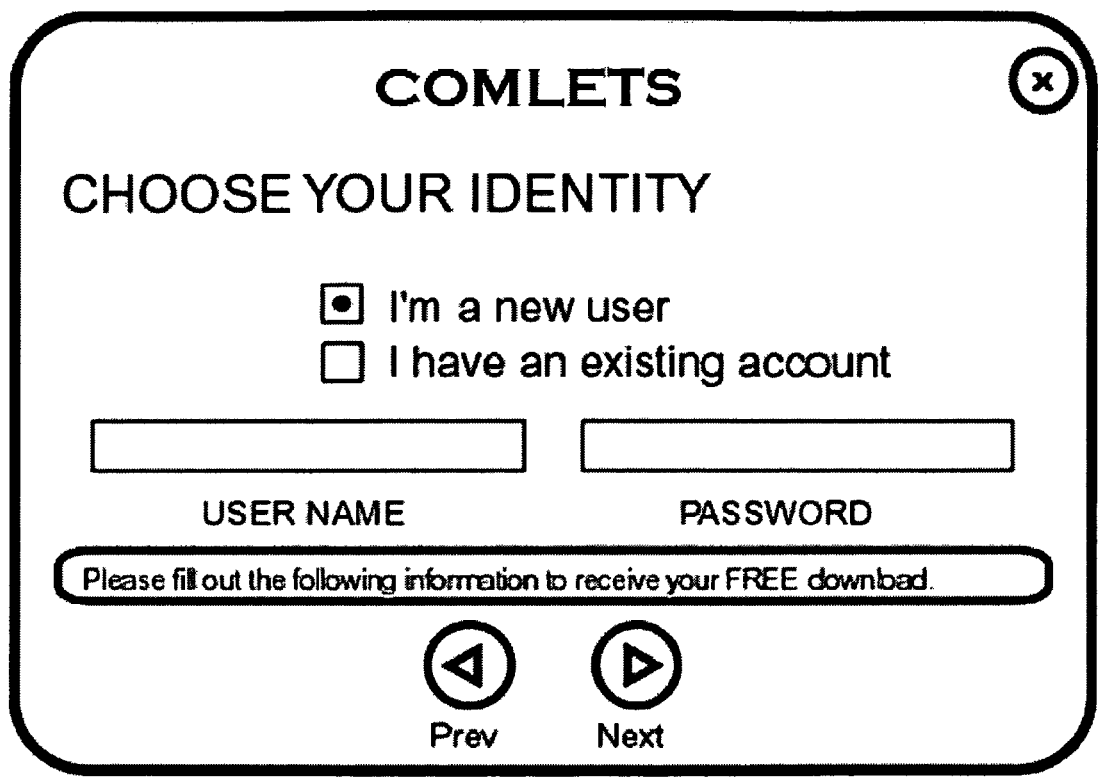
FIGS. 5 through 7 are example comlet data viewers in accordance with the first embodiment of the present invention.
Figure 6:
Figure 7:
Figure 8:
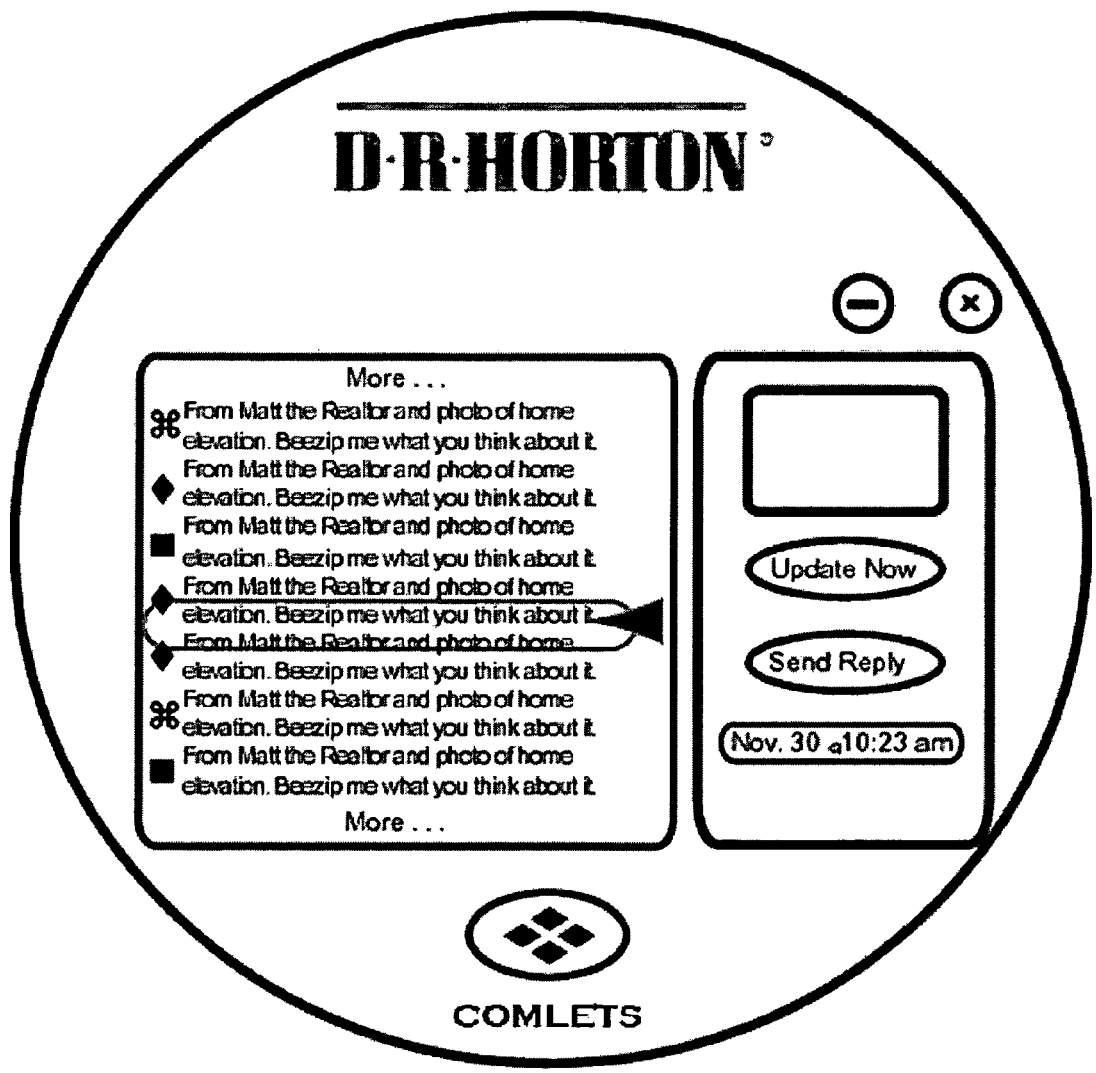
FIG. 8 is an example mailbox at the subscriber station in accordance with the first embodiment of the present invention.
Figure 9:
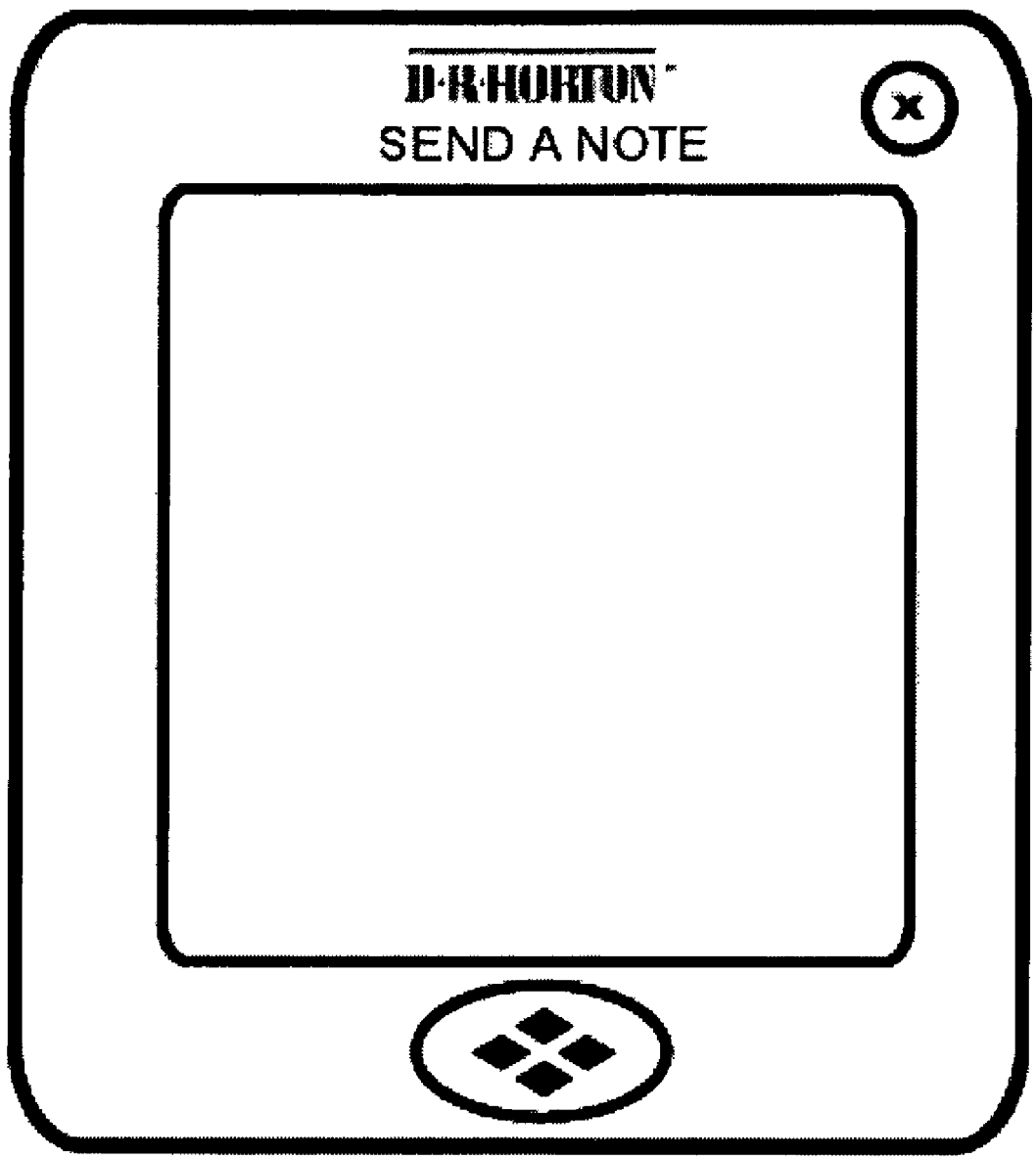
FIG. 9 is a user reply screen of a comlet data viewer in accordance with the first embodiment of the present invention.

FIGS. 5 and 9 represent screens that are generated within the kernel; while FIGS. 6-8 are generated by comlets. FIG. 5 is part of the installation process. FIG. 9 represents the generic reply capability built into the Comlets Viewer 30. In the examples of FIGS. 6-8, the comlets pretty much stay within the same framework (the round Comlets Viewer 30). Although this is perhaps a prescribed friendly behavior for a comlet, a comlet could always break the rules and pretty much draw any presentation that it wants. In a preferred embodiment, the framework (for example, represented by the round Comlets Viewer 30) is a default for any kernel/(business/publisher entity). However, this framework could have a completely different appearance (like a stop sign shaped Comlets Viewer 30) for a different business/publisher entity. In FIG. 5, an introductory Comlets Viewer 30 is created when the subscriber first loads the CD, downloads the file, etc., that is has been provided to the subscriber by the publisher or author 20 (the business). In the example of FIG. 5, the subscriber has already downloaded the kernel 12, has indicated that it is a new Comlets subscriber, and sends that message to the Hub 16. In response, the Hub 16 assigns a unique identifier to the subscriber 22 (since this is the first time the subscriber has accessed the Hub 16 for this particular viewer entity), records the publisher associated with the subscriber 22 software that was just downloaded (via the CD, Internet download, etc.), and returns comlets 17 associated with the particular Comlets Viewer 30 and client author 20. In the example of FIG. 6, a comlet 17 is being executed from the hard drive 18 by the kernel 12. FIG. 6 is an example original introductory "response" information from a realtor associated with a realtor organization called D.R. Horton.

In this example, the realtor, Sue Morgan, is the "author" 20, and the "publisher" is the employer D.R. Horton. FIG. 6 appeared when the subscriber clicked on the D.R. Horton icon, causing the kernel to read the appropriate FIG. 6 comlet 17 that had previously been received by the computer 10 and stored in the hard drive 18 (or other storage device such as a memory). To the subscriber, it appears that he has a dedicated communication connection to D.R. Horton via the desktop icon.

As one can see in FIG. 6, the information provided in the comlet 17 associated with FIG. 6 is substantially more impressive than what can be provided in an e-mail communication. Thus, the present invention is dramatically unlike traditional e-mail communication even though each provides dedicated addressing to a recipient. In the example embodiment, the program code that is travelling with the content in the comlet 17 permits the computer 10, in association with the kernel 12, to create beautiful and impressive multimedia marketing presentations and to do so via dedicated channel communication between the Hub and the subscriber.

FIG. 7 illustrates an example letter presented to the subscriber 22 from the author 20 via a previously downloaded comlet 17. As previously described, the information in the letter was first provided to the authoring interface 25 by the author 20 in simple text format. The authoring interface 25 then converted (using a translet) the simple text into the rich graphics seen in FIG. 7 for delivery as a comlet 17 to the subscriber 22. The next time the subscriber 22 clicked the appropriate icon, the resident kernel 12 ran with the then resident comlet 17 and created the Comlets Viewer shown.

FIG. 8 is an example Comlets Viewer screen, which identifies each of the new messages delivered to the subscriber 22 by the author 20 (sometimes directly and sometimes indirectly) since the last time the kernel 12 accessed the Hub 16. For each of the items in FIG. 8, the subscriber can select the item and immediately execute the Comlets Viewer program code of the associated comlet 17 for the selected messages because the necessary information has already been locally stored at the computer 10.

In the preferred embodiment, the Hub 16 can download all comlets 17 associated with all of the content that the subscriber 22 has not seen since the last time the subscriber accessed Hub 16. Thus, the data accumulator 27 can download all of the appropriate comlets 17 associated with all of the different Comlets Viewers that the subscriber 22 has not yet seen immediately upon the subscriber 22 accessing the Hub 16. In such an instance, when the subscriber makes a selection from FIG. 8, the kernel 12 finds the appropriate comlet 17 from the memory (or hard drive) of the computer 10, executes the appropriate program code for the selected comlet 17, imposes the content data of the comlet 17, and renders the appropriate Comlet viewer as selected.

FIG. 9 illustrates another example Comlets Viewer that has been created by the kernel 12 for the subscriber 22 to record and send a note back to the associated author 20.

Figure 10:
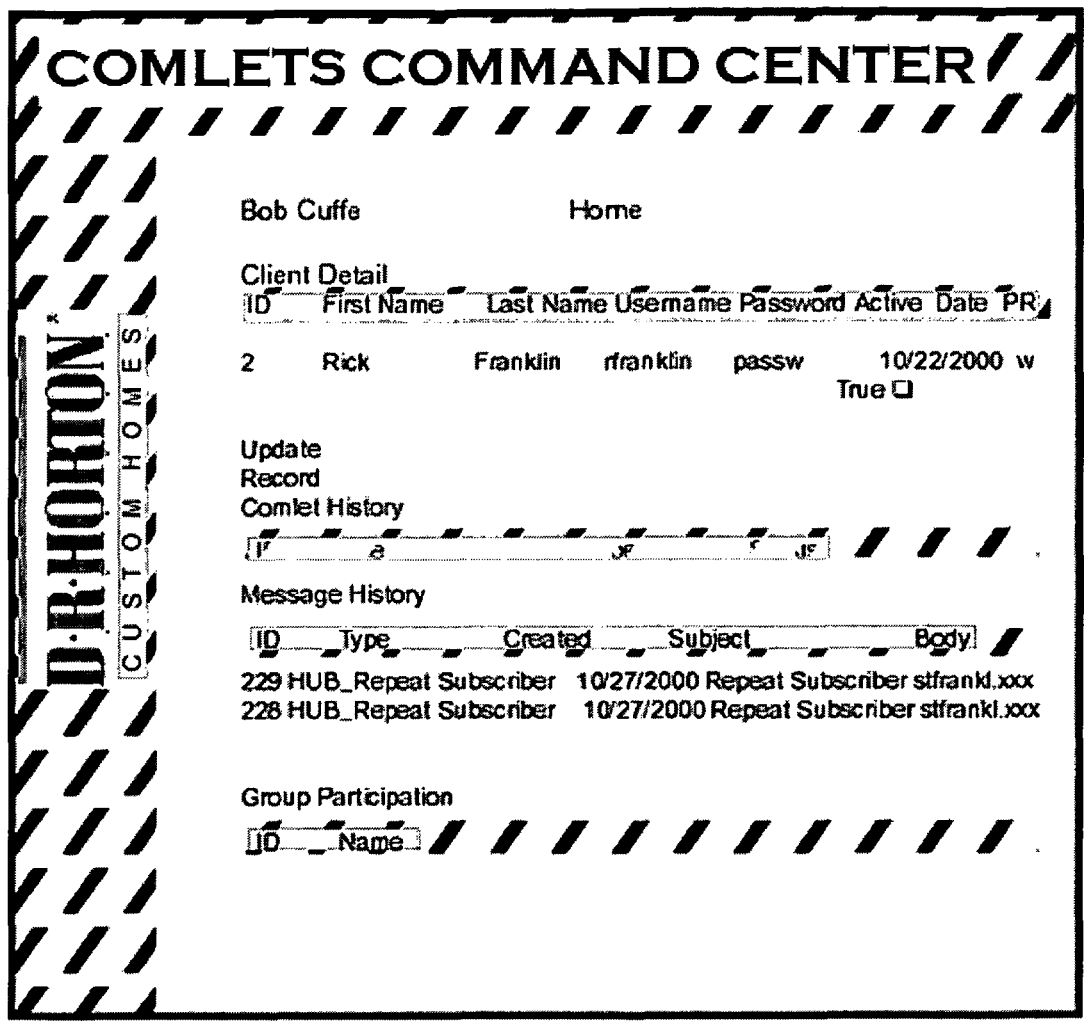
FIG. 10 is an example client command center in accordance with the first embodiment of the present invention.
Figure 11:
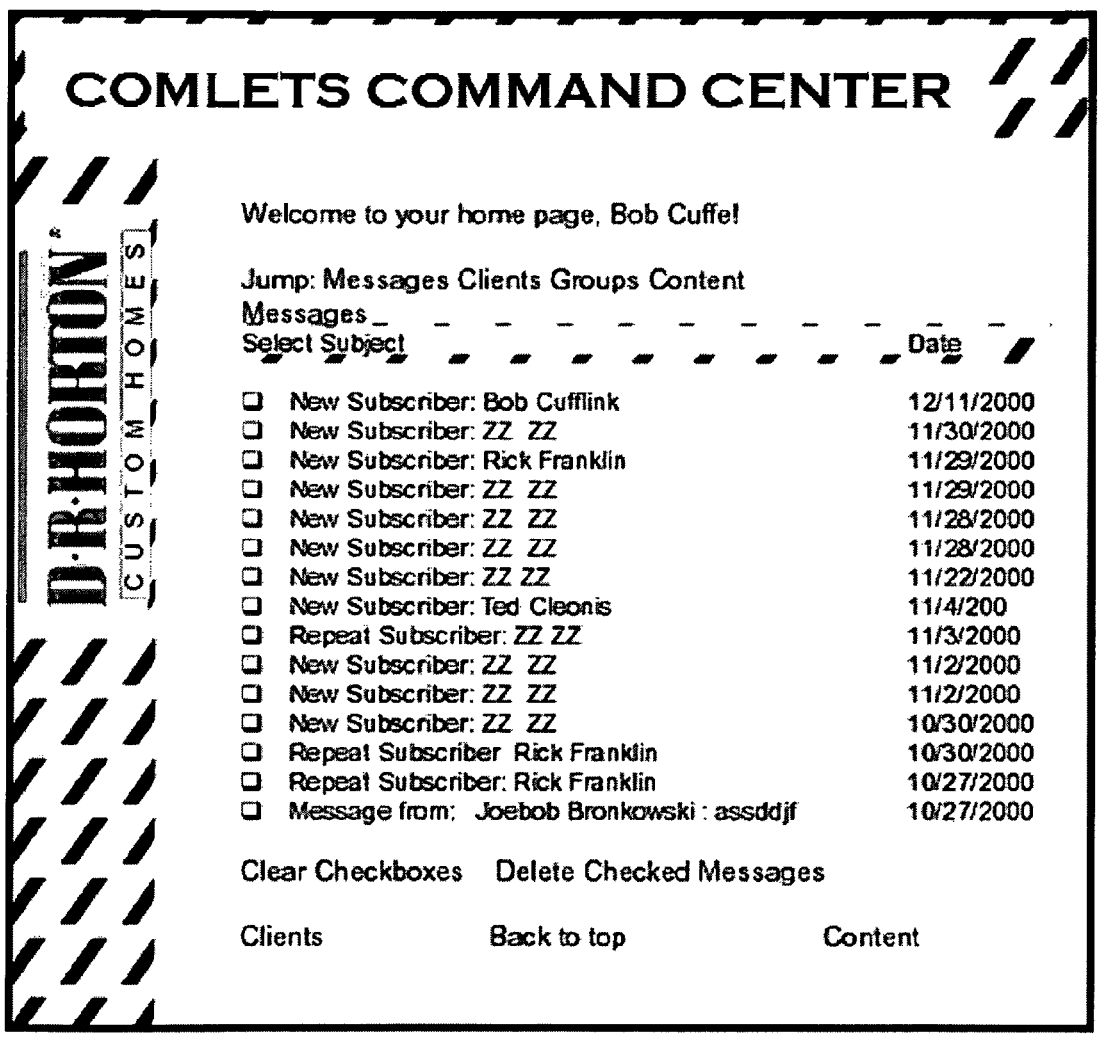
Figure 14:
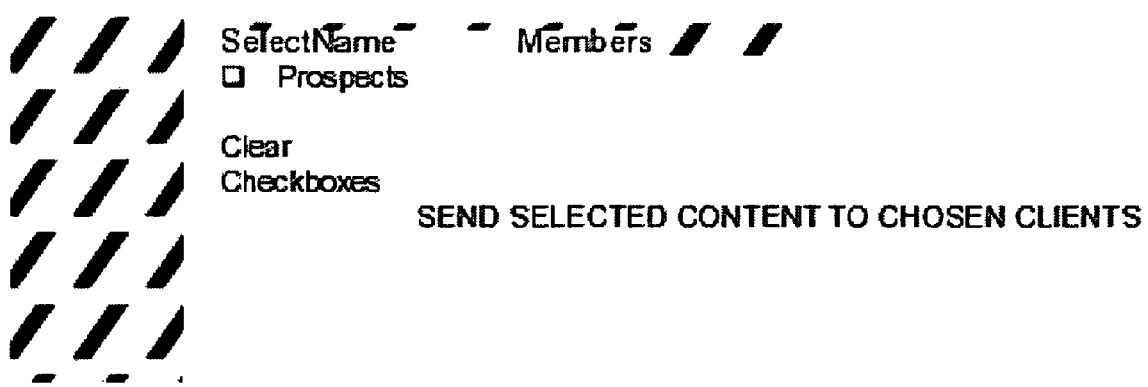

On the subscriber-side of the Hub 16, the subscriber-side interface 22 provides information back to the author 20 regarding the activities of the subscribers that are "owned" by the author (or publisher). In FIG. 10, a command center homepage provides a report to an author 20 whenever a kernel at author 20 computer periodically accesses the Hub 16. First, one can see that the subscribers (who are "clients" to the author 20) are listed by name and ID in the "client detail" section. In this section, the author 20 can update and record information regarding the subscribers described. In the next section, the comlets 17 prepared by the particular author 20 are listed by title, ID, etc. Messages recorded by the author 20 to the Hub 16 are also identified in the message history section. Finally, a group participation section identifies activity associated with groups of subscribers that have been grouped according to the authors' preferences. In FIG. 11, the client command center continues from FIG. 10. Here, messages from each of the subscribers 22 are listed for the author 20. Thus, the first entry records that a new subscriber "Bob Cufflink" accessed the Hub on Dec. 11, 2000. Repeat subscribers are also listed together with the date that they accessed the Hub 16. Finally, messages from the various subscribers that have been written directly to the author 20 are recorded in FIG. 11. The page shown in FIG. 11 can be used by the author to select all new subscribers, for example, to deliver a new subscriber welcome Comlets Viewer (for example, FIG. 6 or FIG. 7).

FIG. 12 illustrates the list of subscribers associated with the author 20 and the list of Comlets Viewers that are presently available to the author for sending to the respective subscribers. Using the page on FIG. 12, the author 20 can quickly checkmark various subscribers "owned" by that author and select comlets 17 to be sent to the respectively selected subscribers. Thus, in FIG. 12, the author may select subscriber "Foca Bob" to receive the "about D.R. Horton . . . Hi Bob" slides. When the author 20 selects "Foca Bob" and the "slide presentation," that content (and the comlets 17 associated therewith) is loaded into data accumulator 27 for delivery to subscriber "Foca Bob" the next time that subscriber's kernel 12 accesses the Hub 16. Thus, the subscriber gets the impression that the author 20 is in a direct one-to-one dialog with the subscriber, even though the author 20 is actually quickly and easily creating high resolution marketing products for the subscribers via Hub 16.

FIG. 13 continues the subscriber list of FIG. 12 and begins (at the bottom of FIG. 13) the "groups" of subscribers that have been arranged according to the preferences of the author 20. The "groups" continue on FIG. 14, with the group identified as "prospects" being listed. The "groups" box operates as a typical group selection facility in which the author 20 can select a larger number of subscribers by simply clicking the group associated with those subscribers.

The Comlets commercial product has various capabilities and corresponding benefits in accordance with the first embodiment of the present invention, which will now be described. Certain of these capabilities and benefits are described in relation to FIGS. 15*a*, 15*b*, or 16.

Reliable kernel with minimal complexity and size. The partial code methodology of the current invention provides for a highly reliable kernel having minimal complexity and size. Referring to FIG. 15*a*, Message_A contains Data_A and Partial Code_A, which is required to execute upon Data_A. Message_A is sent from Server to Client. When Message_A is active, kernel software merges with Partial Code_A to become Comlets Viewer_A having extended functionality required to execute upon Data_A. When Message_A is not active, the Comlets software returns to its kernel state of core functionality. Because it is not necessary for the kernel software to be permanently updated to support Message_A, the complexity and size of the kernel can remain minimal and since partial code is used to extend functionality of the kernel, the kernel can contain a very limited amount of conditional code having high reliability.

Message and functionality synchronization provide automatic software update capabilities. Because partial executable code and the corresponding extended functionality can be associated, or synchronized, with a message(s) having data requiring the extended functionality, a separate update path is not required to update the Comlets kernel software. Because the path transporting the message also transports the partial code in the message that provides the required extended functionality at the time the message is active, there is less need for a separate connection or separate media to install updates. In other words, Comlets features can be updated via the partial code provided in messages. Because the kernel and appropriate partial codes can support multiple versions of messages without the kernel having to retain constant support for older messages, the Comlets kernel rarely requires updating. So, since the Comlets software can, for the most part, be updated and maintained via messages, administrative costs and associated fees normally required to provide software upgrades are significantly reduced and users seldom, if ever, have to install a software upgrade in order to view the latest data formats or otherwise use the latest available Comlets capabilities. Generally, the administrative costs and complexity of synchronizing all Comlets Viewers to the same functionality level is reduced because the partial code provides the functionality within the message itself. The same base version of the Comlets Viewer runs multiple versions of partial code that is supplied by the message that requires it.

Proprietary processing code compartmentalization. In accordance with the present invention, sensitive, or proprietary processing code can be compartmentalized such that partial code is only provided to intended message subscribers. Referring again to FIG. 15a, Message_A could contain Partial code_A that provides proprietary functionality only made available to select users authorized to receive the proprietary processing code. When Message_A is active, this partial code merges with the kernel to provide the required proprietary environment at the time of message processing. Because the proprietary partial code is only delivered to the intended clients, a level of security can be provided using proprietary partial code independent of data encryption or other data security approaches. Partial code and data embedded in the message can also be encrypted as a unit. Furthermore, such sensitive or proprietary code embedded in the partial code can be programmatically shredded at the request of the partial code after the message has been processed, or on a given time and date.

Control over access to data by external programs. The partial code within a message allows the data within the message to stay contained within the message and processed by the partial code rather than exported to disk for processing by external software. This allows the message to control the location of its data, the views of its data, the lifecycle of its data, and report such status.

Improved reliability of message processing. The partial code methodology allows a message to be tested where a standard kernel is merged with the partial code and data of the tested message. This provides more control and consistency between the testing environment and the client processing environment because the kernel software is far less likely to require updates. In addition, because the partial code provides processing of the included data, there is no reliance on external client software that may not be present or not the required version. In FIG. 15b, Message_B consists of partial code_B and data_B. Partial code_B is combined with the kernel software to create a processing environment for testing the message. FIG. 15b shows the message after distribution where the same combination of partial code in the message, data in the message, and kernel combine to create the same functionality created in the testing environment that is also shown in FIG. 15b.

Improved environment for innovation. The partial code methodology provides an improved environment for innovation. Innovation can be implemented within the partial code and then distributed to selected Comlets kernel software users (e.g., beta testers) to create new message processing capabilities without requiring permanent updates to the kernel, or requiring all kernels to be revised to support the innovation. The partial code methodology also allows innovation to be removed or improved without leaving obsolete, or disapproved functionality permanent in the kernel software. If Innovation_A is good, the kernel is extended to support the innovation by the partial code in the message itself. If Innovation_A is not approved or not valuable, the innovation is removed from the partial code in corresponding messages, and the kernel base functionality remains unchanged.

Reduced Regression Testing. The partial code methodology significantly reduces the requirement for regression testing of kernel software. The partial code in the message completes the incomplete functionality of the kernel without requiring that the kernel be permanently changed to support new functionality. Therefore there is reduced need to perform regression testing to verify that changed kernel functionality successfully processes old and new messages. In FIG. 15b, Message B contains new partial code that completes the incomplete functionality of the kernel. The partial code in Message_B merges with the incomplete code of the kernel for the duration of Message_B activity, but does not permanently change the kernel. Therefore all previous messages will continue to work as before. This methodology is fundamentally different than permanently updating the client software, which requires regression testing against previous messages to assure consistent results.

Improved information feedback during creation and testing. The partial code within the message allows the message to participate in its own creation and/or testing. For example, the partial code can extend the Comlets Viewer to detect and report images embedded within the data that it considers unnecessarily large, or possibly too small for the intended display window supplied by the Comlets Viewer, or recommend that large sound files be converted from .WAV to .MP3 format for faster distribution. This testing and reporting can be disabled in the partial code when the message has been successfully composed, tested, and made available for distribution. Since this partial code completes the incomplete functionality of the kernel, the same kernel can be either a test harness or production environment depending upon the state of the partial code that completes it.

The partial code in the message can control the pre-processing and post-processing of the message. Because the partial code completes the incomplete functionality of the kernel, the message can provide its own preprocessing and post-processing code. For example, a message may supply post-processing code that causes the Comlets Viewer to shred and delete a message after it has been processed, even though that post-processing code is not part of the incomplete functionality of the kernel.

The lifetime of a Comlets Viewer can be controlled. In accordance with the invention, the Extended Viewer Capabilities provided by partial code of a given message can exist for only the viewing of the given message, or can exist for one or more following messages. Generally, the lifetime of a Comlets Viewer and associated data can be designed to end under whatever rules are desirable (e.g., after being read once, after a period of time, on a certain date, after N unsuccessful password attempts, etc.).

Presentation code and data management code can be dynamically loaded into the message as partial code via "late binding". The late binding of partial code into messages increases the reliability of the message and allows policies to be applied consistently to all distributed information. For example, a Company may add a company password policy to message viewing and be assured that all subsequent messages will enforce the new policy with the partial code that is embedded in each message just prior to publication.

The base functionality of a kernel can be extended programmatically. The partial code in a message may programmatically add functionality to base kernel functionality by supplying buttons, icons, help, and the processing code associated with the new base functionality. Partial code can programmatically define new or message-specific lifecycle and security policies as an extension of baseline kernel functionality. Such custom services can exist for either the duration of the message, or for one or more future messages.

Partial code may programmatically watermark images in response to the specification of the message composer. For example, partial code may draw specific lines that can be traced back to the point of origin.

The partial code within the message may change the Comlets Viewer dynamically. By dynamically changing the variable names within the partial code in the message and the Comlets Viewer, the same partial code can display in different sizes or process either external data in test mode or embedded data in production mode. The use of the same code statements with a variable string modifier allows the partial code to change the processing of the baseline viewer code for the duration of the message, and also enhances reliability since conditional code paths are reduced or eliminated. For example, the Comlets Viewer may use a variable called "Window"$@Size where the resulting variable name is defined by the string "Window" concatenated by the string located at "Size." The partial code in the message can set the string at location Size to be "BIG" or "SMALL" which changes the programmatic behavior of the partial code of the Comlets Viewer without creating conditional code paths. Partial code may be included with the embedded data in the message to programmatically test the size of images supplied by the Composer and change the viewer processing for the best view window to avoid degradation of quality viewing.

Partial code can process data attributes as specified by the message composer. For example, the partial code in the message can enforce policies such as whether the data is optional or required, or if it has been supplied in the right codex, such as .jpeg or .gif. The partial code allows the message to couple code to data to detect and report fidelity issues within the message before the message creates side effects of missing or incorrect formats.

The partial code can manage multiple instances of mixed media. The partial code can create a more advanced presentation of mixed media within a single window than could reliably be provided by a static message viewer or static media player because neither a static message viewer nor a static media player can reliably know the intent of the Composer at the point of Composition. FIG. 16 shows content of a message corresponding to a mixed media presentation that includes images, video, text, an interactive presentation, web page links, and sound that are presented as a story board of information, which includes another story board of information embedded into it. As such the message content includes the data corresponding to the mixed media as well as partial executable code corresponding to the story board and a user interface able to execute upon the data (mixed media). Generally, the various formats of the media determine the functionality included in the partial executable code that extends the functionality of a kernel executable code as required to produce the presentation.

The combination of a dedicated dialog channel between business and customers, together with the presentation of Comlets Viewers created by the delivery of both content and executable code such that marketing presentations are substantially more robust, has not been presently seen. This advantageous combination presents a large number of possible environments for use of the first embodiment of the present invention including the following:

Daily Shopping

Companies that offer daily deals found on the Internet admit that the biggest problem they have is their customers' reluctance to log on each day and view the deals. Many have started to implement email systems that inform their customers of a deal in which they might be interested, hoping that the email will not get lost amidst other emails and will be read before the deal expires. With Comlets, the authors provide a quality presentation of their information through the Comlets Viewer. This would allow the consumer to enjoy high quality presentations typically associated with Web page presentations, yet without having to log onto the Web, or wade through email.

Network Shopping

Internet companies would love to offer their customers the ability to purchase their product without having to stay on-line. With Comlets, the Internet companies interact with the Hub on their schedule and subscribers interact on their own schedule. Further, Comlets downloads all comlets at one time to the subscriber and thereafter releases the subscriber's computer to execute the comlet code, run the content, and thereby render the data, without intervention by the Internet company servers. This further makes the shopping experience more pleasant for the customer, resulting in greater goodwill for the Internet company.

New Home Sales

Builders and real estate agents can showcase entire lines of homes, both ready-to-occupy and projected buildings. Model homes, rendered drawings, and floor plans can be interactively toured. New home sellers typically have a larger budget, so builders and realtors can produce a glamorous presentation that appeals to a high-dollar market. Individual real estate agents can send newsletters to clients, and can give personalized updates to customers looking for a specific dream home. A mortgage calculator can be another viewer that shows anticipated monthly payments.

Existing Real-Estate Sales

Existing home sales outpace the new home industry by 20 times. Because their inventory line is continuously changing, real estate agents who sell pre-owned homes can take advantage of the auto-composition aspect of Comlets. They can quickly delete and add to the listing with their own digital camera, and speedily send new listings to interested prospects. Video tours and slide shows of the premises-indoors and out-help customers visualize themselves in that home. Community services, school districting, covenants, and restrictions can all be accessed by interested prospects.

Product Sales

Business-to-business and business-to-customer relationships can be strengthened by a personal, secure, private form of communication. Customers can be alerted to new lines and models of products and sales staff can offer pre-announcement previews without alerting their competition. Preferred customer discounts encourage buyer loyalty; interactive ads permit customers to "try on" a product before purchasing and learn more than a paper ad or email allows. Businesses working with distributors can plan sales promotions and track progress as well as highlight a products' selling points. Questions about product features can be asked with confidentiality and speed.

Newsletters

Businesses, organizations and other entities can send communications in multiple formats, customized to the specific needs of each recipient. Feedback can be instantaneous; networking and planning can be shared with selected members.

Fan Clubs

A music company could deliver the Comlets Viewer on a music CD. This could be used as a way for the music company or artist to communicate directly with their fans. They could send letters, music clips of soon-to-be-released music, or even full-length music videos. This method also allows the consumer to purchase products associated with the artist.

Further, sports teams, rock stars, Hollywood actors, pet breeds, and automobiles all have intensely loyal followings. With a Comlets icon on their desktop, these fans can be the first to learn about upcoming appearances, developments, and new products. Distributors will enjoy a higher profit by not having to market fan merchandise through traditional retail outlets. Knowing when their favorite team or performer is coming to town will increase ticket sales. Newsletters can offer background information unavailable elsewhere. In the case of performing musicians, offering the Comlets Viewer on a retail CD will allow the link to be established and continue indefinitely.

Family Photos and Information

The miles between family members can feel diminished by establishing an ongoing family reunion with Comlets. Family genealogy and snapshots of new babies and weddings can be shared; upcoming travel plans can be coordinated and letter-writing can be pipe-lined to multiple family members.

Movie Theatres and Video Rentals

Comlets can provide clips of coming attractions on the desktop to entice movie fans to the theatres. Automatic video reservations assure the fans that their desired selection will be available at the video rental store, by responding to the Comlets advertising comlet. By offering frequent shopper incentives and printable discounts through Comlets, movie buffs have an incentive to keep going back. Cinema distributors spend millions to advertise their latest features. Offering a three-minute snippet on a customer's computer desktop is a focused welcome presentation.

Financial Services

A periodic update from an accountant, a hot tip from the stock broker, and an alert of upcoming maturity for investments will keep clients in the loop on where their money is going and how to keep more of it for themselves. Offering strategies aimed at particular customers' needs helps professionals increase loyalty and commissions, yet also results in satisfied clients.

Restaurants

Preferred customer discounts and a listing of specialties and promotions increases traffic through the door. Patrons with food sensitivities or special needs can contact the chef to ask for special consideration or request a list of ingredients before trying a new item.

Schools

Teachers can post class assignments or initiate private conferences with individual parents. School staff can send targeted announcements to specific families—from sports practice schedules, to academic competitions, to the availability of tutoring. The school's handbook and code of conduct can be posted for consultation by parents and students; cafeteria menus and activity calendars can be sent, and because Comlets is private and confidential, phone numbers and addresses can be shared with recipients. Even the administration and board of education can participate by posting meeting transcripts, newsletters, and contact information.

Interactive Auctions and Collectibles

Buyers and sellers can connect to buy, sell and swap with a new level of convenience. Seekers can post a query for their desired items and be notified when it's put on the auction block. Confidentiality is assured and a high-quality preview of the item for sale is possible with Comlets. Buyers can examine items for quality and general appropriateness before submitting a bid. Credit card processing and order tracking allow the entire process to take place in front of a computer screen. Note, however, that Comlets, because of its offline nature, may not be real-time enough to be an effective auction bidding system. Although it may be great for letting people know about items that will be displayed on auction. The author or subscriber can also post "desired items" and have them download without having to actively get on the Internet.

Market Research and Customer Surveys

Many Americans participate in opinion polls and market preference research. Comlets allows the pollster to select survey candidates that fit a certain criteria and organize the research question and data. Responding to surveys and research is easier for the individual client. Interactive displays allow a client to experience the product before offering his opinion.

Non-Profits and Political Parties

Anyone promoting a cause, concern or candidate knows that the best source of donations is established supporters. Supporters who install Comlets on the their desktop invite ongoing communication about their favorite projects and will respond with support, donations, and votes. Political platforms, rallies and fund-raisers can be announced and targeted to those most likely to respond.

Medical Services

The family doctor or dentist, a plastic surgeon and an outpatient surgery client can all use Comlets to establish a private dialogue with patients. Those requiring monitoring of ongoing conditions can file reports from home that are monitored by professionals in the office. Questions on upcoming procedures can be asked in confidence, background information on various condition can be obtained, and billing records can be accessed. Video presentations can educate patients on conditions and procedures.

Lawn Care

Reviewing landscaping options, scheduling mowing services, and monitoring weather conditions can be done through Comlets to streamline operations and keep customers informed and happy.

Rising Stars

Being able to produce and promote oneself helps a singer, actor or athlete convince agents and executives. Audio and video clips can showcase skill, and the multi-media personalized presentation format demonstrates to potential supporters a sophistication and commitment to technology. Comlets provides an updated, superior alternative to sending in a demo CD or video because it improves the future interaction and dialogue with the prospect.

Employment Services

Prospective employers and employ can view photos, resumes, company profiles and salary packages before scheduling an interview. A company seeking a particular type of employee needs only to specify the criteria and the employment agency will Comlets a file of likely candidates. Job seekers can hone in on likely companies across the country, inquire about policies and compensation, and determine if the fit is likely to be a good one.

Other Applications/Uses

The above are just examples of potential uses of the Comlets technology that benefit from combination of the private dialogue with robust presentations achieved by the present invention. Many, many other applications will also be seen and understood by the artisan once the above description of the present invention is read and understood.

Example Translet

Although many different kinds of translets are envisioned within the scope of the present invention, one example translet will integrate with both a phone and Palm Pilot type PIMS to create voice annotation for comlets. The way it will work (from the user's perspective) is given below. The author first creates some type of comlet with a primary translet application. The primary translet could create a welcome screen comlet, a letter comlet, business card comlet, collage comlet, etc. The translet presented to the author has a checkbox next to the submit button called "add voice annotation." In a first embodiment, when the author presses the submit button, the translet asks the author to record a message as a voice recorded PIM and place the PIM in a caddy attached to the authors' computer. The translet then detects the new message, adds it to the comlet, and then sends the comlet to the Hub for distribution.

In an alternative arrangement, when the author presses the submit button, the translet immediately sends a comlet to the Hub without any voice annotation. When the Hub receives the comlet marked for telephone annotation, it rings the phone number of the author via a voice modem bank connected to the Hub, and asks the author to record his message. When the author hangs up, the annotation is added to the comlet and then queued for distribution.

The exemplary Comlets Viewer of the first embodiment of the present invention is not intended to limit the scope of the invention. One skilled in the art will recognize that the Comlets Viewer could alternatively comprise any functionality other than or in addition to viewing functionality. For example, the media type could be music only and the computing device might not even have a display. For another example, the computing device could correspond to automation control device that controls a robot having a kernel corresponding to various base functionality (e.g., movement, sensing, etc.) where the partial code provided to the robot might correspond to combinations of such base functionality, such as a combination of movements required for the robot to pick up an object and move it to a desired location.

In an alternative arrangement of the first embodiment of the present invention a kernel might correspond to an incomplete client that provides a login for different users. When a specific user logs in to the incomplete client, the incomplete code in the client sends the user information to the Hub, which responds by sending partial code in a Comlet which completes the client to create the environment and features required for the specific user. When that user logs out, the partial code is discarded and the incomplete client returns to its base functionality.

This model allows each user to have a unique feature set without exposing or burdening the features of one user to other users. For example, one login may result in the receipt of partial code in a Comlet that extends the incomplete code in the client to be a very secure product with advanced encryption and security features, while another login can result in the receipt of partial code in a Comlet that extends the incomplete code in the client to become a less secure client, or a client with an interface for a specific disability, or a client which can do unique data processing for the specified user, or a client that can communicate with other clients that are currently at the same feature set, or have partial code that can interface with specific hardware during a specific login.

This model also allows one client to provide different features for each user without adding to the complexity of a single, permanent client, without creating unnecessary complexity for the user if they are not necessary, and without leaving special processing capabilities exposed to users who are not approved to use them or know of them. This model also reduces the size of the client since the size for each user is the size of the incomplete code plus the partial code sent in the Comlet for that user session. The partial code for other users does not need to be on the client except for the time a specific user is logged into the client software.

FIG. 17 depicts an example method 1700 in accordance with the present invention. Referring to FIG. 17, a first step 1702 of method 1700 is to obtain, on a computing device, a first executable code comprising a framework having core functionality. A second step 1704 of method 1700 is to provide a message including partial executable code to the computing device via a communications link, and a third step 1706 of method 1700 is to merge the partial executable code with the framework to extend its functionality. The core functionality may correspond to viewer functionality as with the enhanced presentation/communications system described previously, or the core functionality may correspond to any other functionality such as that of an automation control system.

FIGS. 18a and 18b present an exemplary pie making analogy that compares the data exchange and functionality control model of the prior art and the enhanced data exchange and functionality control model of the present invention. With the conventional approach shown in FIG. 18a, a computing device is programmed to make fruit pies. Installed on the computer are specific versions of software corresponding to certain fruit pie recipes for making cherry pies, apple pies, and blueberry pies. The computing device is able to use its basic capabilities (basic ingredients such as flour, sugar, oven, etc.), its programming (recipes), and supplied data (cherries, apples, or blueberries) to make fruit pies. If a new recipe is discovered for a cherry pie, the computing device must receive an upgrade to its software (i.e., a new recipe) to enable it to make the desired cherry pie. The owner of the computing device must constantly upgrade the client for new recipes and retest the ability to make pies using older recipes. With the enhanced approach of the present invention shown in FIG. 18b, the computing device has a kernel having basic capabilities (basic ingredients such as flour, sugar, oven, etc.) but receives both data (cherries, apples, blueberries, etc.) and partial code (recipes for making the desired pies) that enables the computing device to make the desired pies. Because each message completes the kernel as necessary to make a given pie, the computing device can be provided different data (different fruit, chocolate, coconut, etc) and different partial code (recipes) and can thus make any desired pie using any recipe without updating the kernel software resident on the computing device.

The basic partial code methodology of the present invention lends itself in a broader sense to a new form of automation control where most any object that can be controlled by a program can be developed to have a kernel base functionality that is extended via partial executable code provided via a message received via a communications link. For example, a control device that has a base functionality to measure a fluid flow rate might, via different partial codes, transform into a water meter control device, a gasoline pump control device, or most any other fluid flow control device. Upgrades to the devices would be provided via updated partial executable codes. Generally, most any product involving a computing device and requiring storage resources, for example, memory, hard drive, etc. would require less of such resources since large amounts of code that would have previously been stored locally allowing the device to have multiple modes (or transformations) would instead be provided via much smaller partial codes having 'stream-lined functionality'.

In a second embodiment of the invention, a first executable code, or program, comprising a framework, or kernel, having core functionality is provided to a computing device independent of a user request and without a user installation process. A second executable code, which is a partial executable code, is included in a message provided to the computing device via a communications link (e.g., network). The second executable code merges with the first executable code thereby providing functionality required to execute upon data that may also be provided in the message, provided in one or more following messages, or provided from another source such as a sensor. With this second embodiment of the invention, the first executable code may be installed on a computing device as part of a manufacturing process or product assembly process, or any other method prior to the computing device being associated with any particular user. As such, the user is not required to install (or load) the framework, or kernel, via a subscription process as was the case in the example of the first embodiment of the invention described previously. The communications link interface functionality may be 'activated' by a vendor at the time of purchase, may be configured by an integrator installing the computing device (such as in a factory scenario), may be otherwise active when the computing device is purchased, or may require the user to go through an activation procedure. In accordance with the second embodiment of the invention, the kernel can also be updated programmatically.

FIG. 19 depicts another example method 1900 in accordance with the present invention. Referring to FIG. 19, a first step 1902 of method 1900 is to provide a first executable code comprising a framework having core functionality to a computing device prior to it being associated with a user. A second step 1904 of method 1900 is to provide a message including partial executable code to the computing device via a communications link, and a third step 1906 of method 1900 is to merge the partial executable code with the framework to extend its functionality.

Under one arrangement of the second embodiment of the invention, the computing device provides a user an interface for requesting data (information or media) such as audio, video, digital data, etc. Requesting data via the interface may involve selecting a menu item or an icon, giving a voice command, making a recognizable body part movement (e.g., moving a hand from left to right), or another means for requesting the data. After data has been requested, a determination is made as to whether the executable code on the computing device has necessary functionality necessary to execute on the requested data. If the executable code present on the computing device does not have required executable functionality, a message is provided via the communications link. The message includes partial executable code that merges with the first executable code to provide functionality required to execute upon the requested data, which can be provided in the same message as the partial executable code, can be provided in one or more following messages, or can be provided from another source. If the executable code present on the computing device is already able to execute on the requested data, then one or more messages having the requested data is provided to the computing device via the communications link or the requested data is provided via another source. For example, a user may request via an icon on a touch display that music by a certain band be played by the computing device. When the request is received, partial executable code is received in a message and merges with the kernel to enable the music playing functionality of the computing device as necessary to play the requested music. Similarly, a user may select a weather update service function, whereby the latest capabilities for the service are provided via partial executable code that is merged with the kernel to create the appropriate Comlets Viewer required to present the weather information. Generally, under this arrangement, new partial executable code can be provided to the computing device to add to or replace the extended functionality provided by previous partial executable code(s). As such, for any data requested by the user of a computing device, appropriate partial executable code can be provided to merge with the framework (or kernel) as necessary for the computing device to execute upon the requested data.

FIG. 20 illustrates an exemplary set top box scenario in accordance with the second embodiment of the present invention. Referring to FIG. 20, a television 2002 is associated with a set top box 2004 having connectivity to a cable television network 2006. Set top box 2004 has factory installed kernel software having base functionality able to display a menu of available media titles (e.g., movies, music videos, etc.) available to the user via a media provider. Controller 2008 is used to select an icon 2010 corresponding to media title N. Set top box requests Media Title N from cable television network 2006 and a message having partial executable code and Media Title N is received by set top box 2004 from cable television network 2006. The received partial executable code merges with the kernel software resident on set top box 2004 thereby enabling set top box 2004 to play Media Title N. Referring again to FIG. 20, if the user then selects icon 2012 corresponding to Media Title N+1 cable television network 206 may recognize set top box 2004 is already able to execute upon (play) data corresponding to Media Title N+1 in which case it will only provide a message having data corresponding to Media Title N+1 for it to be played. However, if Media Title N+1 has a different format or otherwise requires new partial executable code, then new partial executable code and data corresponding to Media Title N+1 are provided to set top box 2004, where the new partial executable code merges with the kernel software resident on set top box 2004 thereby enabling set top box 2004 to play Media Title N+1.

Generally, the partial executable code methodology of the present invention provides an elegant solution to the problem of media pirating. Under the existing approach to providing media to consumers, a copy of a media (e.g., a DVD containing a movie) is purchased (or rented) by a consumer that then plays the copy on a media player (e.g., a DVD player). As such, the media players are designed and produced to read (or execute upon) media conforming to a standard data format(s). However, this fundamental separation of the media (i.e., the data) from the media player (i.e., the media player functionality) lends itself to piracy because it becomes difficult to discern an authentic copy of a media from a bootlegged (or pirated) copy. With the present invention, the problem of pirating can be completely avoided. For example, media players can be developed that have framework core functionality. Alternatively, the framework core functionality may be received via a communications network such as via website download, or via an alternative means such as a CD sent in the mail. This framework core functionality can be used to identify the owner of the media player in various ways to include an ID associated with the media player, an ID associated with the user, a password, an IP address, etc. This consumer identifying information can be conveyed in one of various ways to a media provider (e.g., a movie rental business). Thereafter, when media is sold (or rented) to the consumer, the identifying information can be included in partial executable code that is included on the media that must merge with the framework core functionality on the media player to enable the media player to execute upon (or play) the media. Alternatively, identifying information may be controlled by a media provider. For example, a CD music service can allow a customer to download a first executable code from a website. The executable code could include an identifier for the customer. The customer would load the executable code on a CD player. Thereafter, any CDs ordered by the customer would include partial executable code including the same identifier that would have to match that included in the first executable code for the CD to be readable by the CD player. Because such consumer identifying information can be carefully controlled and used to ensure that a specific copy of a media will only work with a specific media player(s) owned by the consumer, the problem of illegal copying of media can be substantially reduced.

The partial executable code methodology of the present invention enables products (and services) to be very closely associated with a specific user. For example, a person might carry a card in his wallet that can be read by a card reader, e.g., a magnetic card reader. Alternatively, the person may have an active RFID device associated with him that transmits a signal read by a reader device or the person might have an electronic device such as a smart phone or PDA that could communicate with a reader device. Generally, a communications link can be provided with most any object associated with a specific user. In any case, the information conveyed to a given reader device would include partial executable code that defines functionality of the card (or RFID device, phone, PDA, etc.) and identifies the user. Under this arrangement, the communications network of the present invention comprises the communications link between the card (or RFID device, phone, PDA, etc.) and the corresponding reader device. The partial executable code conveyed via the communications link would merge with framework executable code included in various authentication devices associated with various products (or services). As such, a person might be able to operate a motor vehicle, pump gas, use a vending machine, purchase groceries, board a plane, or perform any other function as long as an authentication control device having a framework executable code can successfully merge with partial executable code conveyed by an identification device.

One skilled in the art will recognize that requiring two executable codes to successfully merge to provide authentication and provide/define functionality enables much more extensive and secure authentication capabilities than those currently employed, which typically involve requiring a communicated identifier (data) to match data stored in a database. For example, a parent of a college freshmen might use an interface provided by a transaction card provider to write to a transaction card partial executable code defining what the student is able to purchase with the card (e.g., healthy food, personal hygiene items, gasoline, etc.) and what the child is not able to purchase (e.g., unhealthy food, tobacco products, alcoholic beverages). The card would also identify the student. As such, when the student attempts to use the card to purchase beer, the partial executable code when merged with the framework code used by the device reading the card would cause the beer purchase using the card to be disallowed. As such, the functionality of a transaction card (or RFID device) can at least be partially controlled by the owner of the card. Such cards could contain partial executable code that describes user tendencies that could be used to speed up transactions. For example, one's usual order at a given food establishment might be included. Such cards could even be 'programmed' to alert authorities given unauthorized use (or functioning) of the card. For example, a person might include in the card's partial executable code a rule such as "warn authorities of stolen card should card be used to purchase gas other than Chevron gas in an amount more than $20". Such a rule might be applicable to a person who always purchases Chevron gas instead of other brands unless Chevron gas is not available in which case the person limits the purchase to $20. Should the card be lost or stolen and someone then try to use it in a manner not allowed, then authorities could be alerted. Similarly, the framework code used by a provider of a product or service might itself include various rules and thresholds such as built in price discounts based on buying patterns, etc. Thus, when applied to products and services, the present invention enables rules, parameters, thresholds, and all sorts of functionality control measures to be taken into account in addition to user authentication.

The partial executable code methodology of the present invention can be used to solve many of the problems inherent to today's public email systems such as SPAM and malicious attachments. Such existing email systems can be augmented (or even replaced) by an email system based on the present invention whereby email messages include partial executable code that must merge with the reader to enable the message to be read. As with the media copying prevention example described above, with coordination between the sender and the receiver emails, undesirable emails can be easily recognized and filtered. Additionally, with such coordination various security features such as encryption, automatic message destruction, and the like can be implemented. And, as previously described, the attachments of such an email system would execute independent of programs residing on the computer platform receiving the email.

Under another arrangement of the second embodiment of the invention, a computing device receives partial executable code to establish or modify the desired functionality of the computing device, for example, an automation control device in an automated or semi-automated environment such as a manufacturing facility. Under such an arrangement, typically a control facility would manage one or more automation control devices, in which case messages containing partial executable code would establish or modify the functionality of a system being controlled, such as a robotic assembly device. By selecting a menu item, an icon, giving a voice command, making a recognizable body part movement (e.g., moving a hand from left to right) or otherwise requesting the data, a control facility can be used to manage the executable code on the one or more computing devices as necessary for the computing devices to be able to execute on the data to be provided to them via a message or another source. After such remote configuration, the computing devices will be able to act upon data received via messages sent across the communications link or from another source. As with the previously described arrangement of the second embodiment of the invention, at any time, new partial executable code can be provided to the computing device to essentially add to or replace the extended functionality provided by previous partial executable code(s). As such, for any data for which it is desirable that the computing device execute upon, appropriate partial executable code can be provided to merge with a framework (or kernel) as necessary for the computing device to execute upon the data.

FIG. 21 depicts an example assembly line 2102 having robotic arms 2104 controlled by automation control devices 2106 in accordance with the second embodiment of the present invention. Automation control devices 2106 interface via a wireless communications network 2108 with control facility 2110 (not shown). Optical sensors 2112 assist robotic arms 2104 in determining exact positioning of objects moving down the assembly line 2102. Automation control devices 2106 have kernel software providing base functionality for controlling functionality of the robotic arms 2104. Control facility 2110 sends messages containing partial executable code via communications network 2108 to automation control devices 2106 where the partial executable code is merged with the kernel software to complete functionality required to control the functionality of the robotic arms 2104 including responding to data provided by sensors 2112. If the robotic arms require new functionality, new messages having new partial executable code corresponding to the required new functionality are provided by control facility 2110 to automation control devices 2106 to modify the functionality of the robotic arms 2104, as appropriate.

Various combinations of the first and second embodiments can be employed as alternative embodiments of the invention. For example, in one alternative embodiment, first executable code having core functionality is provided to a computing device. As with the first embodiment the user of the computing device can request data that results in a message containing partial executable code being provided to the computing device to merge with the first executable code as required to execute upon the requested data. As with the second embodiment, a control facility may also independently provide updated first executable code and/or updated partial executable code independent of a specific user request, for example, as a result of a change in format to data or to the presentation of data being provided to a user as part of a previously requested service, such as a severe weather warning service.

In another alternative embodiment, a computing device receives partial executable code to establish or modify the desired functionality of the computing device, for example, an automation control device in an automated or semi-automated environment such as a manufacturing facility. Typically a control facility would manage one or more automation control devices, in which case messages containing partial executable code would establish or modify the functionality of a system being controlled, such as a robotic assembly system. By selecting a menu item, an icon, giving a voice command, making a recognizable body part movement (e.g., moving a hand from left to right) or otherwise requesting the data, a person at the control facility could manage the executable code on the one or more computing devices as necessary for the computing devices to be able to execute on the data to be provided to them via a message or another source. After such remote configuration, the computing devices will be able to execute upon data received by the computing devices via messages sent across the communications network or execute upon data received from another source. One of various methods can be employed to provide feedback (or input) to the control facility from the automation control devices. Under one approach, one or more sensors may monitor one or more parameters associated with the environment of a system associated with one or more of the automation control devices, or of the system itself, or of one or more of the automated control devices, where sensor information is provided to the control facility, for example, via the communications link. Based on the sensor information, the control facility may send a message to an automation control device to vary the functionality of the system being controlled by the automation control device.

In a still further alternative embodiment of the invention, a first executable code having core functionality is provided to a computing device, where the core functionality is able to request data (or functionality) in accordance with sensor information corresponding to the environment of the computing device, measured user tendencies, or other measured parameters, and able to apply rules and established boundary conditions so as to request messages having data (partial executable code) considered appropriate to the circumstances. In other words, what might be described as a form of artificial intelligence (AI) could allow the computing device to learn from and recognize circumstances to which it could react by requesting data from a central facility, whereby messages containing partial executable code would essentially modify a computing devices functionality as a result of the sensor information, measurements, rules, and established boundary conditions. For example, a PDA having such AI capabilities might 'learn' that the user of the PDA regularly listens to certain music during a certain time on a certain night of the week and therefore automatically request a message corresponding to the user's favorite music and corresponding partial executable code required to enable functionality necessary to automatically enable the user's favorite music player thereby automatically playing the user's favorite music at the appropriate time.

While the invention has been described in connection with what is presently considered to be the most practical and preferred embodiments it is to be understood that the invention is not to be limited to the disclosed embodiments but on the contrary, is intended to cover various modifications and equivalent arrangements included within the spirit and scope of the appended claims.

What is claimed is:

1. A computing device running an operating system, said computing device comprising:
 a storage device, said storage device including an application program comprising a first executable code providing core functionality to said computing device, said core functionality providing a framework for the execution of program routines received from a source, said framework comprising core functions and data exchange functions for establishing a communications link with said source and receiving a message from said source;

a processor; and an interface to said communications link, said computing device using said data exchange functions to establish said communications link and to receive a message via said communications link, said message including a data and a partial executable code that requires additional executable code comprising said first executable code to enable said computing device to execute on said data, said partial executable code defining a functional environment associated with said message, said functional environment determining how said data is used by said application program regardless of the format of the data, said partial executable code having said program routines that complete said core functions to create said functional environment thereby fully enabling said application program to execute upon said data within said functional environment, said partial executable code being able to execute upon said data independent of any other executable code, said core functionality having no understanding of the format of said data or of said functional environment, said partial executable code requiring said core functionality provided by said first executable code to function.

2. The computing device of claim 1, wherein said data comprises at least one of a graphic, a photograph, an e-mail, a music, a voice message, a video, an interactive program, a media, or sensor information.

3. The computing device of claim 1, wherein said first executable code is provided to a user of said computing device via one of a compact disk, a digital video disk, a floppy disk, an e-mail, or a web site location.

4. The computing device of claim 1, wherein said first executable code is provided to said storage device during at least one of a manufacturing process or a product assembly process.

5. The computing device of claim 1, wherein said computing device comprises at least one of a desktop computer, a personal computer, a laptop computer, a personal digital assistant, a smart phone, a set top box, an authentication control device, or an automation control device.

6. The computing device of claim 1, wherein said partial executable code completes said core functionality as required to execute on said data.

7. The computing device of claim 1, wherein said data source is at least one of said message, a following message, or a sensor.

8. The computing device of claim 1, further comprising:
a user interface, wherein said message is provided in response to a user interface associated with the computing device.

9. The computing device of claim 1, wherein said message is provided in response to a control interface associated with a control facility.

10. The computing device of claim 1, wherein said message is provided to said computing device in accordance with at least one of sensor information corresponding to the environment of the computing device, a measured user tendency, a measured parameter, a rule, or an established boundary condition.

11. A method of controlling functionality of a computing device running an operating system, said method comprising the steps of:

a. providing said computing device an application program comprising a first executable code having core functionality, said core functionality providing a framework for the execution of program routines received from a source, said framework comprising core functions and data exchange functions for establishing a communications link with said source and receiving a message from said source; and b. providing said computing device a message, said message including a data and a partial executable code that merges with said first executable code to extend said core functionality, said partial executable code defining a functional environment associated with said message, said functional environment determining how said data is used by said application program regardless of the format of the data, said partial executable code having said program routines that complete said core functions to create said functional environment thereby fully enabling said application program to execute upon said data within said functional environment, said partial executable code being able to execute upon said data independent of any other executable code, said core functionality having no understanding of the format of said data or of said functional environment, said partial executable code requiring additional executable code comprising said first executable code to function.

12. The method of claim 11, wherein said message is provided via at least one of a communications link, a public network, a wireless network, magnetism, a media, or an active RFID transmission.

13. The method of claim 11, further comprising:
c. authenticating at least one of an identify of a person, ownership of a product, or authorization to perform a function.

14. The method of claim 11, wherein said message includes data and said extending said core functionality enables said computing device to execute upon said data.

15. The method of claim 11, wherein said computing device comprises at least one of a desktop computer, a personal computer, a laptop computer, a personal digital assistant, a smart phone, a set top box, an authentication control device, or an automation control device.

16. The method of claim 11, wherein said message is provided in response to
at least one of a request made via a user interface of the computing device, a request from a control facility, or a request by the computing device based upon at least one of sensor information corresponding to the environment of the computing device, a measured user tendency, a measured parameter, a rule, or an established boundary condition.

* * * * *